(12) United States Patent
Washio

(10) Patent No.: US 10,683,001 B2
(45) Date of Patent: Jun. 16, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventor: Taichi Washio, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/247,893

(22) Filed: Jan. 15, 2019

(65) Prior Publication Data

US 2019/0241172 A1 Aug. 8, 2019

(30) Foreign Application Priority Data

Feb. 7, 2018 (JP) .................................. 2018-020366

(51) Int. Cl.
| | |
|---|---|
| *F16H 61/662* | (2006.01) |
| *B60W 10/107* | (2012.01) |
| *F16H 9/04* | (2006.01) |
| *F16H 61/66* | (2006.01) |

(52) U.S. Cl.
CPC ............ *B60W 10/107* (2013.01); *F16H 9/04* (2013.01); *F16H 61/66259* (2013.01); *B60W 2710/1005* (2013.01); *F16H 2061/6605* (2013.01)

(58) Field of Classification Search
CPC ......... B60W 10/107; B60W 2710/1005; F16H 61/66259; F16H 9/04; F16H 2061/6605; F16H 61/66; F16H 61/662; F16H 2061/6614; F16H 37/02; F16H 61/0204
See application file for complete search history.

(56) References Cited

U.S. PATENT DOCUMENTS

| | | | | |
|---|---|---|---|---|
| 2006/0247086 | A1* | 11/2006 | Watanabe | B60K 6/365 |
| | | | | 475/208 |
| 2016/0229406 | A1* | 8/2016 | Okabe | B60W 10/02 |

FOREIGN PATENT DOCUMENTS

| | | |
|---|---|---|
| JP | 4870060 B2 | 2/2012 |
| JP | 2017-036783 A | 2/2017 |
| JP | 2017-133678 A | 8/2017 |

* cited by examiner

*Primary Examiner* — David J Hlavka
(74) *Attorney, Agent, or Firm* — Oliff PLC

(57) ABSTRACT

A control apparatus for a vehicle drive-force transmitting apparatus that defines first and second drive-force transmitting paths between input and output rotary members. The second drive-force transmitting path is established by engagement of a second engagement device. The control apparatus includes an operation-state determining portion configured to determine which one of a plurality of states is established as an operation state of the second engagement device, by determining whether a plurality of transition-completion conditions, each of which is required to determine that a transition of the operation state of the second engagement device to a corresponding one of the plurality of states from another of the plurality of states has been completed, are satisfied or not, based on (α) a state of a hydraulic control executed to control a hydraulic pressure supplied to the second engagement device and (β) a rotational speed difference of the second engagement device.

10 Claims, 8 Drawing Sheets

CONTROL APPARATUS FOR VEHICLE DRIVE-FORCE TRANSMITTING APPARATUS

This application claims priority from Japanese Patent Application No. 2018-020366 filed on Feb. 7, 2018, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus has a plurality of drive-force transmitting paths that are provided in parallel with each other between a drive force source and drive wheels of the vehicle.

BACKGROUND OF THE INVENTION

There is known a control apparatus for a vehicle drive-force transmitting apparatus that includes: an input rotary member to which a drive force is to be transmitted from a drive force source; an output rotary member from which the drive force is to be outputted to drive wheels; a gear mechanism configured to provide at least one gear ratio; and a continuously-variable transmission mechanism, wherein the drive-force transmitting apparatus defines a plurality of drive-force transmitting paths that are provided in parallel with each other between the input rotary member and the output rotary member, and the plurality of drive-force transmitting paths include a first drive-force transmitting path through which the drive force is to be transmitted by the gear mechanism, and a second drive-force transmitting path through which the drive force is to be transmitted by the continuously-variable transmission mechanism. JP-2017-36783A discloses such a control apparatus for a vehicle drive-force transmitting apparatus, teaching a control of a gear ratio of the continuously-variable transmission mechanism in the drive-force transmitting apparatus defining the first and second drive-force transmitting paths that are provided in parallel with each other, wherein the drive force is to be transmitted through the first drive-force transmitting path by the gear mechanism when the first drive-force transmitting path is established by engagement of a first engagement device, and wherein the drive force is to be transmitted through the second drive-force transmitting path by the continuously-variable transmission mechanism including primary and secondary pulleys and a transfer element that is looped over the primary and secondary pulleys when the second drive-force transmitting path is established by engagement of a second engagement device. In the control apparatus disclosed in this Japanese Patent Application Publication, it is determined whether the second engagement device is in a fully released state or a slipped state, based on a command value of a hydraulic pressure supplied to the second engagement device in a hydraulic control, and the gear ratio of the continuously-variable transmission mechanism is controlled with the highest priority being given to prevention of an excessive rotation of the secondary pulley of the continuously-variable transmission mechanism when it is determined that the second engagement device is in the fully released state or the slipped state.

It is noted that the term "gear ratio" is defined as "rotational speed of input-side rotary member/rotational speed of output-side rotary member". For example, the gear ratio of the above-described continuously-variable transmission is defined as "rotational speed of the primary pulley/rotational speed of the secondary pulley", and the gear ratio of the above-described drive-force transmitting apparatus is defined as "rotational speed of the input rotary member/rotational speed of the output rotary member". A vehicle running speed could be lower as the gear ratio is higher, and could be higher as the gear ratio is lower. For example, a highest gear ratio can be expressed also as a lowest-speed gear ratio.

SUMMARY OF THE INVENTION

By the way, an operation state of the second engagement device is represented by, for example, four states consisting of a fully released state, a fully engaged state, a releasing process state and an engaging process state, namely, the operation state of the second engagement device is switched among, for example, the four states. Where the continuously-variable transmission mechanism is controlled depending on the operation state of the second engagement device, if the operation state of the second engagement device cannot be appropriately determined, there could be a risk that it may be difficult to establish a target gear ratio of the continuously-variable transmission mechanism, or a slippage of the transfer element may occur where the continuously-variable transmission mechanism is a belt-type continuously-variable transmission. The actual operation state of the second engagement device is likely to differ from a state of the hydraulic control executed for the second engagement device, for example, when the operation state of the second engagement device is switched from one of the four states to another of the four states or is in transition from one of the four states to another of the four states, and/or When there is a failure of an electromagnetic valve or other device provided to regulate the hydraulic pressure supplied to the second engagement device. Thus, where the operation state of the second engagement device is determined only based on a command value of the supplied hydraulic pressure supplied in the hydraulic control, there is a possibility that the determination could not be made accurately or satisfactorily. Therefore, it is desirable that the determination of the operation state of the second engagement device, namely, the determination as to which one of the four states the second engagement device is placed in, can be made with high accuracy.

The present invention was made in view of the background art described above. It is therefore an object of the present invention to provide a control apparatus for a vehicle drive-force transmitting apparatus, which is capable of determining the operation state of the second engagement device with improved accuracy.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: an input rotary member to which a drive force is to be transmitted from the drive force source; an output rotary member from which the drive force is to be outputted to the drive wheels; a gear mechanism configured to provide at least one gear ratio; a continuously-variable transmission mechanism; a first engagement device; and a second engagement device whose operation state is to be switched among a plurality of states including a fully released state, a fully engaged state, a releasing process state and an engaging process state, by a hydraulic pressure which is supplied to the second engagement device and which is subjected to a hydraulic control. The drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism when the first drive-force transmitting path is established by engagement of the first engagement device, and the plurality of drive-force transmitting paths include a second drive-force transmitting path through which the drive force is to be transmitted by the continuously-variable transmission mechanism when the second drive-force transmitting path is established by engagement of the second engagement device. The control apparatus comprises: an operation-state determining portion that is configured to determine which one of the plurality of states is established as the operation state of the second engagement device, by determining whether a plurality of transition-completion conditions, each of which is required to determine that a transition of the operation state of the second engagement device to a corresponding one of the plurality of states from another of the plurality of states has been completed, are satisfied or not, based on ($\alpha$) a state of the hydraulic control executed to control the hydraulic pressure supplied to the second engagement device and ($\beta$) a rotational speed difference of the second engagement device. It is noted that all of the plurality of transition-completion conditions do not necessarily have to be conditions whose satisfaction is to be determined based on both of ($\alpha$) the state of the hydraulic control executed to control the hydraulic pressure supplied to the second engagement device and ($\beta$) the rotational speed difference of the second engagement device. That is, the operation-state determining portion may be configured to determine whether at least one of the plurality of transition-completion conditions is satisfied or not, based on ($\alpha$) the state of the hydraulic control executed to control the hydraulic pressure supplied to the second engagement device and ($\beta$) the rotational speed difference of the second engagement device, and to determine whether the other of the plurality of transition-completion conditions is satisfied or not, based on ($\alpha$) the state of the hydraulic control executed to control the hydraulic pressure supplied to the second engagement device. For example, the plurality of transition-completion conditions include (i) a second condition that is required to determine that the transition of the operation state of the second engagement device to the fully released state from the fully engaged state, releasing process state or engaging process state has been completed, and (ii) a third condition that is required to determine that the transition of the operation state of the second engagement device to the fully engaged state from the fully released state, releasing process state or engaging process state has been completed, wherein the operation-state determining portion is configured to determine whether the second condition is satisfied or not, based on ($\alpha$) the state of the hydraulic control executed to control the hydraulic pressure supplied to the second engagement device and ($\beta$) the rotational speed difference of the second engagement device, and wherein the operation-state determining portion is configured to determine whether the third condition is satisfied or not, based on ($\alpha$) the state of the hydraulic control executed to control the hydraulic pressure supplied to the second engagement device and ($\beta$) the rotational speed difference of the second engagement device.

According to a second aspect of the invention, in the control apparatus according to the first aspect of the invention, the continuously-variable transmission mechanism includes (i) a primary pulley, (ii) a secondary pulley, (iii) a transfer element that is looped over the primary and secondary pulleys, (iv) a primary hydraulic actuator configured to apply, to the primary pulley, a primary thrust based on which the transfer element is to be clamped by the primary pulley, and (v) a secondary hydraulic actuator configured to apply, to the second primary pulley, a secondary thrust based on which the transfer element is to be clamped by the secondary pulley, wherein the control apparatus comprises a transmission shifting control portion configured to calculate an input torque which is inputted to the continuously-variable transmission mechanism and which is used in calculations of a target value of the primary thrust and a target value of the secondary thrust, such that the input torque is calculated depending on the one of the plurality of states that is determined, by the operation-state determining portion, to be established as the operation state of the second engagement device.

According to a third aspect of the invention, in the control apparatus according to the second aspect of the invention, the transmission shifting control portion is configured to calculate, as the input torque which is inputted to the continuously-variable transmission mechanism, (a) a first input torque that is used in calculation of a thrust ratio which is a ratio of the secondary thrust to the primary thrust and which is for establishing a target gear ratio of the continuously-variable transmission mechanism and (b) a second input torque that is used in calculation of the primary and secondary thrusts required to prevent a slippage of the transfer element in the continuously-variable transmission mechanism.

According to a fourth aspect of the invention, in the control apparatus according to any one of the first through third aspects of the invention, the plurality of transition-completion conditions include a first condition that is required to determine that the transition of the operation state of the second engagement device to the engaging process state from the fully released state or releasing process state has been completed, wherein the first condition is that the hydraulic control is executed to engage the second engagement device, and wherein the operation-state determining portion is configured to determine that the operation state of the second engagement device has been switched to the engaging process state, if the first condition is satisfied when the second engagement device had been in the fully released state or releasing process state.

According to a fifth aspect of the invention, in the control apparatus according to any one of the first through fourth aspects of the invention, the plurality of transition-completion conditions include a second condition that is required to determine that the transition of the operation state of the second engagement device to the fully released state from the fully engaged state, releasing process state or engaging process state has been completed, wherein the second condition includes first, second and third requirement options, such that (i) the first requirement option is that a rotational speed of an input shaft of the continuously-variable transmission mechanism is not lower than a predetermined speed value and a rotational speed difference of the second engagement device is larger than a first predetermined difference value with the hydraulic control being executed to release the second engagement device by a command requesting the supplied hydraulic pressure to be not higher than a first predetermined pressure value, (ii) the second requirement option is that the rotational speed of the input shaft of the continuously-variable transmission mechanism is lower than the predetermined speed value and the hydraulic control is executed to release the second engagement device by a command requesting the supplied hydraulic pressure to be not higher than a second predetermined pressure value that is lower than the first predetermined pressure value, and (iii) the third requirement option is that the drive-force transmitting apparatus is placed in a neutral state with both of the first and second engagement devices being released, and wherein the operation-state determining portion is configured to determine that the operation state of the second engagement device has been switched to the fully released state, if any one of the first, second and third requirement options of the second condition is satisfied when the second engagement device had been in the fully engaged state, releasing process state or engaging process state.

According to a sixth aspect of the invention, in the control apparatus according to any one of the first through fifth aspects of the invention, the plurality of transition-completion conditions include a third condition that is required to determine that the transition of the operation state of the second engagement device to the fully engaged state from the fully released state, releasing process state or engaging process state has been completed, wherein the third condition includes first and second requirement options, such that (i) the first requirement option is that a rotational speed difference of the second engagement device is smaller than a second predetermined difference value with the hydraulic control being executed to engage the second engagement device by a command requesting the supplied hydraulic pressure to be not lower than a third predetermined pressure value, and (ii) the second requirement option is that the state of the hydraulic control has been switched from execution for engaging the second engagement device to execution for maintaining the fully engaged state, and wherein the operation-state determining portion is configured to determine that the operation state of the second engagement device has been switched to the fully engaged state, if either one of the first and second requirement options of the third condition is satisfied when the second engagement device had been in the fully released state, releasing process state or engaging process state.

According to a seventh aspect of the invention, in the control apparatus according to any one of the first through sixth aspects of the invention, the plurality of transition-completion conditions include a fourth condition that is required to determine that the transition of the operation state of the second engagement device to the releasing process state from the fully engaged state has been completed, wherein the fourth condition is that a rotational speed difference of the second engagement device is not smaller than a third predetermined difference value with the hydraulic control being executed to release the second engagement device, and wherein the operation-state determining portion is configured to determine that the operation state of the second engagement device has been switched to the releasing process state, if the fourth condition is satisfied when the second engagement device had been in the fully engaged state.

According to an eighth aspect of the invention, in the control apparatus according to any one of the first through seventh aspects of the invention, the plurality of transition-completion conditions include a fifth condition that is required to determine that the transition of the operation state of the second engagement device to the releasing process state from the engaging process state has been completed, wherein the fifth condition is that the hydraulic control is executed to release the second engagement device, and wherein the operation-state determining portion is configured to determine that the operation state of the second engagement device has been switched to the releasing process state, if the fifth condition is satisfied when the second engagement device had been in the engaging process state.

According to an ninth aspect of the invention, in the control apparatus according to any one of the first through eighth aspects of the invention, the hydraulic control is executed to engage or release the second engagement device, by controlling the hydraulic pressure supplied to the second engagement device, wherein the hydraulic control is executed to engage the second engagement device, when a first state of the drive-force transmitting apparatus in which the first drive-force transmitting path is established is to be switched to a second state of the drive-force transmitting apparatus in which the second drive-force transmitting path is established, or when a neutral state of the drive-force transmitting apparatus in which both of the first and second engagement devices are released is to be switched to the second state of the drive-force transmitting apparatus, and wherein the hydraulic control is executed to release the second engagement device, when the second state of the drive-force transmitting apparatus is to be switched to the first state of the drive-force transmitting apparatus, or when the second state of the drive-force transmitting apparatus is to be switched to the neutral state of the drive-force transmitting apparatus.

In the control apparatus according to the first aspect of the invention, it is determined which one of the plurality of states (including the fully released state, fully engaged state, releasing process state and the engaging process state) is established as the operation state of the second engagement device, by determining Whether the plurality of transition-completion conditions, each of which is required to determine that the transition of the operation state of the second engagement device to a corresponding one of the plurality of states from another of the plurality of states has been completed, are satisfied or not, based on ($\alpha$) a state of the hydraulic control executed to control the hydraulic pressure supplied to the second engagement device and ($\beta$) a rotational speed difference of the second engagement device. Thus, the determination as to which one of the plurality of states is established as the operation state of the second engagement device is made by taking account of not only a tendency of increase or reduction of the hydraulic pressure supplied to the second engagement device and/or a command value of the supplied hydraulic pressure in the hydraulic control but also how the second engagement device is being actually operated. It is therefore possible to determine the operation state of the second engagement device with improved accuracy.

In the control apparatus according to the second aspect of the invention, the input torque inputted to the continuously-variable transmission mechanism, which is to be used in calculations of the target value of the primary thrust and the target value of the secondary thrust, is calculated depending on one of the plurality of states that is determined to be established as the operation state of the second engagement device. Thus, the continuously-variable transmission mechanism can be appropriately controlled by using the input torque that corresponds to the operation state of the second engagement device which is determined with high accuracy.

In the control apparatus according to the third aspect of the invention, as the input torque which is inputted to the continuously-variable transmission mechanism, (a) the first input torque that is used in calculation of the thrust ratio that is for establishing the target gear ratio of the continuously-variable transmission mechanism and (b) the second input torque that is used in calculation of the primary and secondary thrusts required to prevent a slippage of the transfer element in the continuously-variable transmission mechanism are calculated whereby the continuously-variable transmission mechanism can be appropriately controlled.

In the control apparatus according to the fourth aspect of the invention, the plurality of transition-completion conditions include the first condition that is required to determine that the transition of the operation state of the second engagement device to the engaging process state from the fully released state or releasing process state has been completed, wherein the first condition is that the hydraulic control is executed to engage the second engagement device. It is determined that the operation state of the second engagement device has been switched to the engaging process state, if the first condition is satisfied when the second engagement device had been in the fully released state or releasing process state. Thus, the engaging process state as the operation state of the second engagement device can be appropriately determined.

In the control apparatus according to the fifth aspect of the invention, the plurality of transition-completion conditions include the second condition that is required to determine that the transition of the operation state of the second engagement device to the fully released state from the fully engaged state, releasing process state or engaging process state has been completed, wherein the second condition includes the first, second and third requirement options, such that (i) the first requirement option is that a rotational speed of an input shaft of the continuously-variable transmission mechanism is not lower than a predetermined speed value and a rotational speed difference of the second engagement device is larger than a first predetermined difference value with the hydraulic control being executed to release the second engagement device by a command requesting the supplied hydraulic pressure to be not higher than a first predetermined pressure value, (ii) the second requirement option is that the rotational speed of the input shaft of the continuously-variable transmission mechanism is lower than the predetermined speed value and the hydraulic control is executed to release the second engagement device by a command requesting the supplied hydraulic pressure to be not higher than a second predetermined pressure value that is lower than the first predetermined pressure value, and (iii) the third requirement option is that the drive-force transmitting apparatus is placed in a neutral state with both of the first and second engagement devices being released. It is determined that the operation state of the second engagement device has been switched to the fully released state, if any one of the first, second and third requirement options of the second condition is satisfied when the second engagement device had been in the fully engaged state, releasing process state or engaging process state. Thus, the fully released state as the operation state of the second engagement device can be appropriately determined.

In the control apparatus according to the sixth aspect of the invention, the plurality of transition-completion conditions include the third condition that is required to determine that the transition of the operation state of the second engagement device to the fully engaged state from the fully released state, releasing process state or engaging process state has been completed, wherein the third condition includes first and second requirement options, such that (i) the first requirement option is that a rotational speed difference of the second engagement device is smaller than a second predetermined difference value with the hydraulic control being executed to engage the second engagement device by a command requesting the supplied hydraulic pressure to be not lower than a third predetermined pressure value, and (ii) the second requirement option is that the state of the hydraulic control has been switched from execution for engaging the second engagement device to execution for maintaining the fully engaged state. It is determined that the operation state of the second engagement device has been switched to the fully engaged state, if either one of the first and second requirement options of the third condition is satisfied when the second engagement device had been in the fully released state, releasing process state or engaging process state. Thus, the fully engaged state as the operation state of the second engagement device can be appropriately determined.

In the control apparatus according to the seventh aspect of the invention, the plurality of transition-completion conditions include the fourth condition that is required to determine that the transition of the operation state of the second engagement device to the releasing process state from the fully engaged state has been completed, wherein the fourth condition is that the rotational speed difference of the second engagement device is not smaller than a third predetermined difference value with the hydraulic control being executed to release the second engagement device. It is determined that the operation state of the second engagement device has been switched to the releasing process state, if the fourth condition is satisfied when the second engagement device had been in the fully engaged state. Thus, the releasing process state as the operation state of the second engagement device can be appropriately determined.

In the control apparatus according to the eighth aspect of the invention, the plurality of transition-completion conditions include the fifth condition that is required to determine that the transition of the operation state of the second engagement device to the releasing process state from the engaging process state has been completed, wherein the fifth condition is that the hydraulic control is executed to release the second engagement device. It is determined that the operation state of the second engagement device has been switched to the releasing process state, if the fifth condition is satisfied when the second engagement device had been in the engaging process state. Thus, the releasing process state as the operation state of the second engagement device can be appropriately determined.

In the control apparatus according to the ninth aspect of the invention, the operation state of the second engagement device can be determined with improved accuracy in the hydraulic control executed to engage or release the second engagement device.

DETAILED DESCRIPTION OF PREFERRED EMBODIMENT

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

The above-described drive force source is, for example, an internal combustion engine such as a gasoline engine and a diesel engine generating a drive force by combustion of fuel supplied thereto. The vehicle may be equipped with, in addition to or in place of, a drive force source in the form of the engine, another drive force source in the form of, for example, an electric motor.

Hereinafter, a preferred embodiment of the invention will be described in detail with reference to the accompanying drawings.

Embodiment

Figure 1:
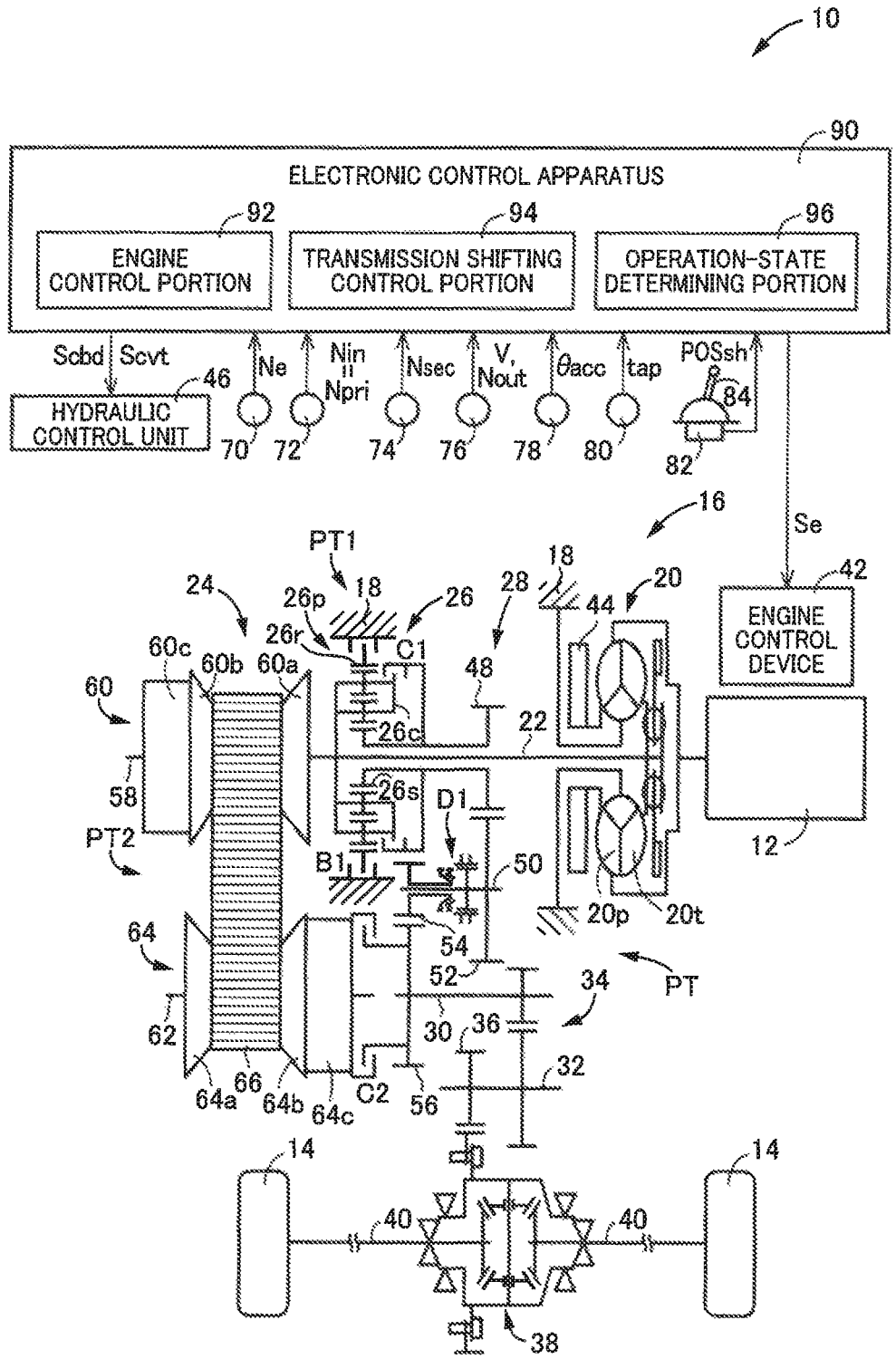
FIG. 1 is a schematic view showing a construction of a vehicle to be controlled by a control apparatus according to the present invention, and major control functions and control portions of the control apparatus.

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path Pill constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism. 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, P12 is established. The plurality of engagement devices include a first clutch C1, a first brake B1 and a second clutch C2. The first clutch C1, which serves as a first engagement device, is provided in the first drive-force transmitting path PT1 and configured to selectively connect and disconnect the first drive-force transmitting path PT1, such that the first drive-force transmitting path PT1 is established with engagement of the first clutch C1 during forward running of the vehicle 10. The first brake B1, which serves as an engagement device, is provided in the first drive-force transmitting path PT1 and configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to "control apparatus" recited in the appended claims), based on an operation amount $\theta_{acc}$ of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
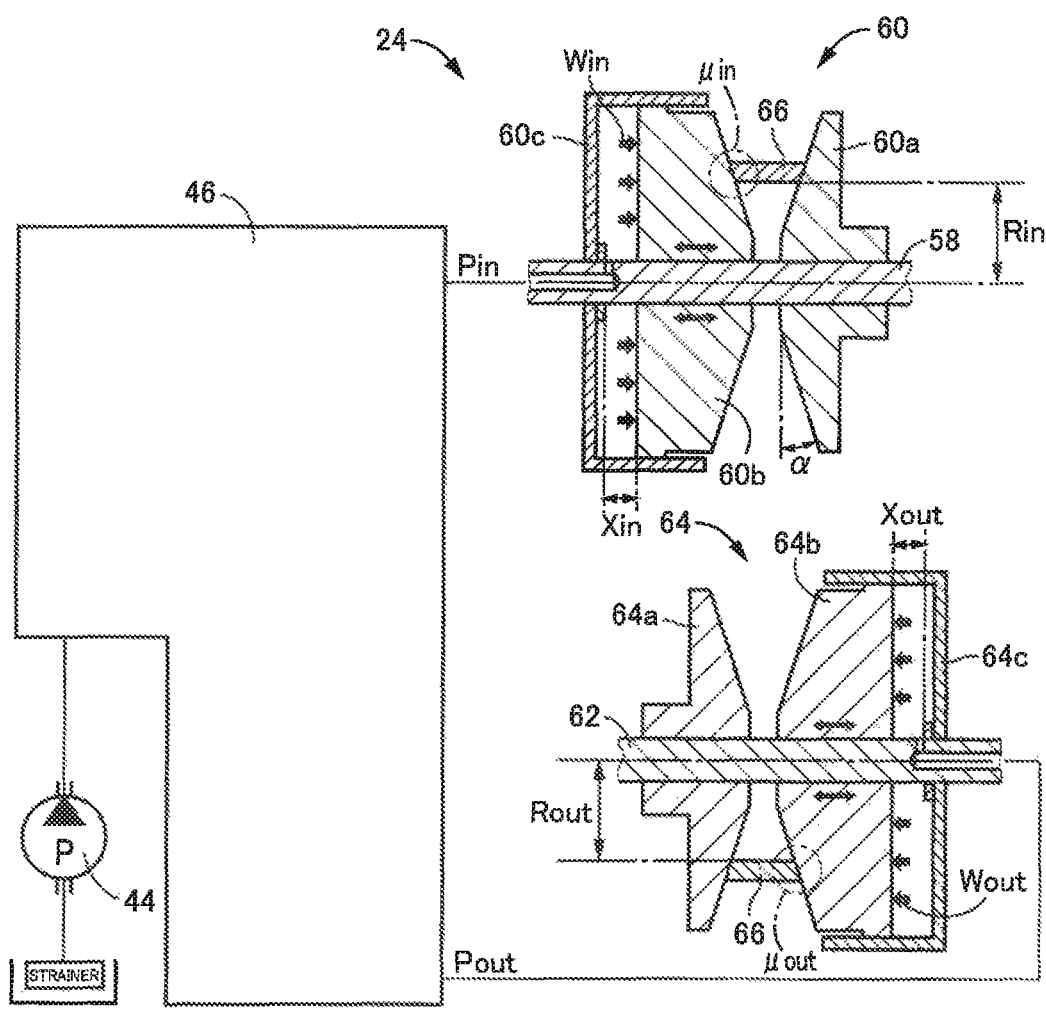
FIG. 2 is a view for explaining a construction of a continuously-variable transmission mechanism.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Win to the movable sheave 60b. The primary thrust Win is a thrust primary pressure Pin*pressure receiving area) for changing a width of a V-shaped groove defined between the fixed and movable sheaves 60a, 60b of the primary pulley 60. That is, the primary thrust Win is a thrust applied to the primary pulley 60 from the hydraulic actuator 60c, to clamp the transmission belt 66 that is mounted on the primary pulley 60. The primary pressure Pin is a hydraulic pressure supplied from the hydraulic control unit 46 to the hydraulic actuator 60c, and serves as a pulley hydraulic pressure for generating the primary thrust Win. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wout to the movable sheave 64b. The secondary thrust Wout is a thrust (=secondary pressure Pout*pressure receiving area) for changing a width of a V-shaped groove defined between the fixed and movable sheaves 64a, 64b of the secondary pulley 64. That is, the secondary thrust Wout is a thrust applied to the secondary pulley 64 from the secondary hydraulic actuator 64c, to clamp the transmission belt 66 that is mounted on the secondary pulley 64. The secondary pressure Pout is a hydraulic pressure supplied from the hydraulic control unit 46 to the secondary hydraulic actuator 64c, and serves as a pulley hydraulic pressure for generating the secondary thrust Wout.

In the continuously-variable transmission mechanism 24, the primary and secondary pressures Pin, Pout are controlled by the hydraulic control unit 46 that is controlled by the electronic control apparatus 90, whereby the primary and secondary thrusts Win, Wout are respectively controlled. With the primary and secondary thrusts Win, Wout being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Win, Wout being controlled, the belt clamping force is controlled such that slipping of the transmission belt 66 is not caused. That is, with the primary and secondary thrusts Win, Wout being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Pin is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Pin is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Win and the secondary thrust Wout, and the target gear ratio γcvttgt is established by a combination of the primary thrust Win and the secondary thrust Wout, rather than by only one of the primary thrust Win and the secondary thrust Wout. As described below, the gear ratio γcvt of the continuously-variable transmission mechanism 24 is changed with change of a thrust ratio τ(=Wout/Win) which is a ratio of the secondary thrust Wout to the primary thrust Win and which is dependent on a relationship between the primary pressure Pin and the secondary pressure Pout. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear input-shaft rotational speed Nin/output-shaft rotational speed Nout) provided in the first drive-force transmitting path. PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic control operation for switching the operation state of each of the plurality of engagement devices (C1, B1, C2, D1). The electronic control apparatus 90 may be constituted by two or more control units exclusively assigned to perform different control operations such as the engine control operation and the hydraulic control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in Which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path. PT2 is established. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running, of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92, a transmission shifting control means or portion in the form of a transmission shifting control portion 94 and a state determining means or portion in the form of a state determining portion 96.

The engine control portion 92 calculates a target drive force Fwtgt, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tetgt that ensures the target drive force Fwtgt, and outputs the engine-control command signal Se for controlling the engine 12 so as to obtain the target engine torque Tetgt. The outputted engine-control command signal Se is supplied to the engine control device 42.

When the operation position POSsh of the shift lever 84 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path. PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 94 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission shifting control portion 94 executes a stepped shifting control to engage and release the first and second clutches C1, C2, respectively, so as to cause the drive-force transmitting apparatus 16 to execute the shift-down action by which the selected running mode is switched from the belt running mode in which the second drive-three transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Pin and the secondary pressure Pout such that the target gear ratio γcvttgt is established in the continuously-variable transmission mechanism 24 while the belt slippage is not caused in the continuously-variable transmission mechanism 24. This hydraulic-control command signal Scvt includes a primary-pressure command signal Spin requesting the primary pressure Pin to become a target primary pressure Pintgt and a secondary-pressure command signal Spout requesting the secondary pressure Pout to become a target secondary pressure Pouttgt.

The target primary pressure Pintgt is a target value of the primary pressure Pin by which a primary target thrust Wintgt that is a target value of the primary thrust Win applied to the primary pulley 60 is generated. The target secondary pressure Pouttgt is a target value of the secondary pressure Pout by which a secondary target thrust Wouttgt that is a target value of the secondary thrust Wout applied to the secondary pulley 64 is generated. In calculation of each of the primary target thrust Wintgt and the secondary target thrust Wouttgt, a required thrust, which is minimally required to prevent the belt slippage on a corresponding one of the primary and secondary pulleys 60, 64, is taken into consideration. This required thrust is a belt-slip limit thrust Wlmt that is a thrust value shortly before occurrence of the belt slippage in the continuously-variable transmission mechanism 24. In the following description relating to the present invention, the belt-slip limit thrust Wlmt will be referred to as "slip limit thrust Wlmt".

Specifically, the transmission shifting control portion 94 calculates each of the primary target thrust Wintgt and the secondary target thrust Wouttgt. The transmission shifting control portion 94 compares the secondary thrust Wout, which is calculated based on a primary-side slip limit thrust Winlmt that is the slip limit thrust Wlmt minimally required to prevent slippage of the transmission belt 66 on the primary pulley 60, with a secondary-side slip limit thrust Woutlmt that is the slip limit thrust Wlmt minimally required to prevent slippage of the transmission belt 66 on the secondary pulley 64, and then selects a larger one of the secondary thrust Wout and the secondary-side slip limit thrust Woutlmt. The secondary thrust Wout, which is calculated based on the primary-side slip limit thrust Winlmt, is a secondary-side shifting-control thrust Woutsh that is required to be applied to the second pulley 64 in a shifting control, as described below.

The transmission shifting control portion 94 sets, as the primary target thrust Wintgt, the primary thrust Win calculated based on the secondary target thrust Wouttgt. The primary thrust Win, which is calculated based on the secondary target thrust Wouttgt, is a primary-side shifting-control thrust Winsh that is required to be applied to the, primary pulley 60 in a shifting control, as described below. Further, as described below, the transmission shifting control portion 94 compensates the primary-side shifting-control thrust Winsh, namely, compensates the primary target thrust Wintgt, by a feedback control of the primary thrust Win that is executed based on a gear ratio deviation Δγcvt (=γcvttgt−γcvt) that is a deviation of the actual gear ratio γcvt from the target gear ratio γcvttgt.

In the above-described compensation of the primary-side shifting-control thrust Winsh, a deviation of an actual value from a target value in each parameter that has a one-to-one correspondence relationship with the gear ratio γcvt may be used in place of the gear ratio deviation Δγcvt. For example, in the compensation of the primary-side shifting-control thrust Winsh, it is possible to use a deviation ΔXin (=Xintgt−Xin) of an actual position Xin of the movable sheave $60b$ from a target position Xintgt of the movable sheave $60b$ in the primary pulley 60 (see FIG. 2), a deviation ΔXout (−Xoutgt-Xout) of an actual position Xout of the movable sheave $64b$ from a target position Xintgt of the movable sheave $64b$ in the secondary pulley 64 (see FIG. 2), a deviation ΔRin (=Rintgt−Rin) of an actual belt-winding diameter (actual effective diameter) Rin from a target belt-winding diameter (target effective diameter) Rintgt in the primary pulley 60 (see FIG. 2), a deviation ΔRout (=Routtgt−Rout) of an actual belt-winding diameter (actual effective diameter) Rout from a target belt-winding diameter (target effective diameter) Routtgt in the secondary pulley 64 (see FIG. 2), and a deviation ΔNpri (=Npritgt−Npri) of an actual primary rotational speed Npri from a target primary rotational speed Npritgt.

Each of the above-described primary-side shifting-control thrust Winch and secondary-side shifting-control thrust Woutsh is a thrust required to be applied to a corresponding one of the primary and secondary pulleys 60, 64 in a shifting control to execute a desired shifting action to establish the target gear ratio γcvttgt at a target shifting speed dγtgt (that is a target value of a shifting speed dγ). The shifting speed dγ is a rate (=dγcvt/dt) of change of the gear ratio γcvt, namely, an amount (=dγcvt/dt) of change of the gear ratio γcvt per a unit of time. In the present embodiment, the shifting speed dγ is defined as an amount (−dX/dNelm) of pulley displacement per an element of the transmission belt 66, wherein "dX" represents an amount of displacement of the pulley in an axial direction of the pulley per a unit of time, and "dNelm" represents a number of elements (of the transmission belt 66) that are caused to bite into the pulley (i.e., caused to enter the V-shaped groove of the pulley) per the unit of time. The shifting speed dγ is represented by a primary shifting speed dγin (=dXin/dNelmin) and a secondary shifting speed dγout dγout(=d Xout/dNelmout).

The thrust, which is applied to each of the pulleys 60, 64 in a steady state in which the gear ratio γcvt is constant, is referred to as "balance thrust Wb1" that is referred also to as "steady thrust". The thrust ratio r is represented as a ratio (=Woutb1/Winb1) of a secondary balance thrust Woutb1 to a primary balance thrust Winb1, wherein the secondary balance thrust Woutb1 is the balance thrust Wb1 of the secondary pulley 64 and the primary balance thrust Winb1 is the balance thrust Wb1 of the primary pulley 60. On the other hand, in the steady state, if one of the thrusts applied to the respective pulleys 60, 64 is increased or reduced by a certain amount, the steady state is lost whereby the gear ratio γcvt is changed thereby generating the shifting speed dγ that corresponds to the certain amount by which the one of the thrusts is increased or reduced. The certain amount, by which the thrust is increased or reduced, will be referred to as "gear-ratio changing thrust ΔW" that is referred also to as "transient thrust". Where the gear ratio γcvt is changed to the target gear ratio γcvttgt by changing the thrust applied to the primary pulley 60, the gear-ratio changing thrust ΔW is represented by a primary gear-ratio changing thrust ΔWin that corresponds to an amount by which the thrust applied to the primary pulley 60 is increased or reduced. Where the gear ratio γcvt is changed to the target gear ratio γcvttgt by changing the thrust applied to the secondary pulley 64, the gear-ratio changing thrust ΔW is represented by a secondary gear-ratio changing thrust ΔWout that corresponds to an amount by which the thrust applied to the secondary pulley 64 is increased or reduced.

Where one of the primary-side shifting-control thrust Winsh and secondary-side shifting-control thrust Woutsh, which are thrusts required to be applied to the respective primary and secondary pulleys 60, 64 in a shifting control, has been set, the other of the primary-side shifting-control thrust Winsh and secondary-side shifting-control thrust Woutsh is set to a sum of the balance thrust Wb1 and the gear-ratio changing thrust ΔW, wherein the balance thrust Wb1 is dependent on the above-described one of the primary-side shifting-control thrust Winsh and secondary-side shifting-control thrust Woutsh and the thrust ratio τ corresponding to the target gear ratio γcvttgt, and the gear-ratio changing thrust ΔW corresponds to the target shifting speed dγtgt of change of the target gear ratio γcvttgt. The target shifting speed dγtgt is represented by a primary target shifting speed dγintgt and a secondary target shifting speed dγouttgt. The primary gear-ratio changing thrust ΔWin is a positive value (ΔWin>0) that is larger than zero in a shift-up state in which the gear ratio γcvt is to be reduced, and is a negative value (ΔWin<0) that is smaller than zero in a shift-down state in which the gear ratio γcvt is to be increased. The primary gear-ratio changing thrust ΔWin is zero (ΔWin=0) in a steady state in which the gear ratio γcvt is constant. Further, the secondary gear-ratio changing thrust ΔWout is a negative value (ΔWout<0) that is smaller than zero in the shift-up state, and is a positive value (ΔWout>0) that is larger than zero in the shift-down state. The secondary gear-ratio changing thrust ΔWout is zero (ΔWout=0) in the steady state.

Figure 3:
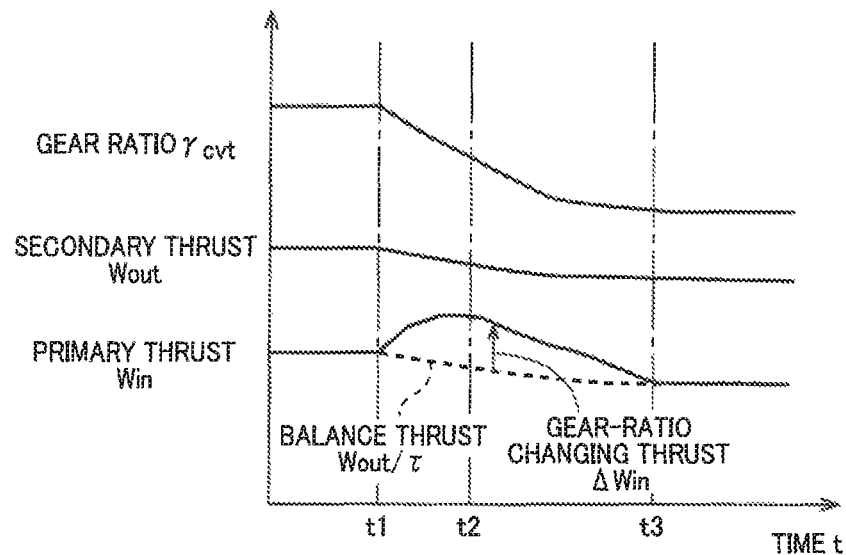
FIG. 3 is a view showing an example for explaining thrusts required for a shifting control.
Figure 4:
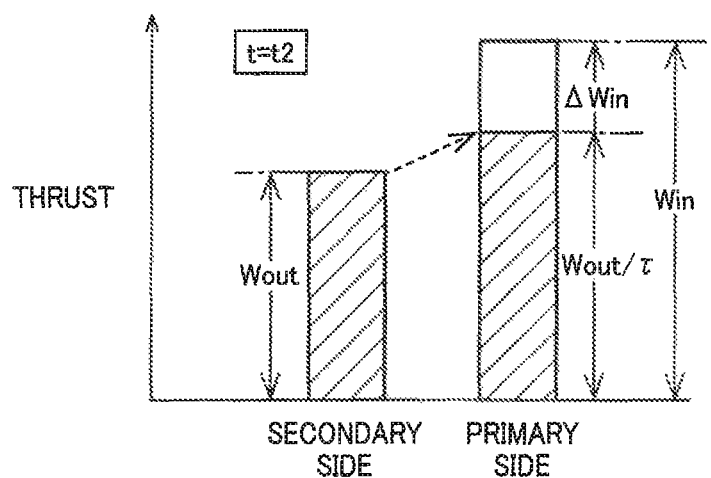
FIG. 4 is a view showing, by way of example, a relationship between the thrusts at a point t2 of time shown in FIG. 3.

FIG. 3 is a view showing an example for explaining thrusts required for a shifting control. FIG. 4 is a view showing, by way of example, a relationship between the thrusts at a point t2 of time shown in FIG. 3. FIGS. 3 and 4 show, by a way of example, the primary thrust Win that is set in a case where a desired shift-up action is executed by increasing the primary thrust Win while setting the secondary thrust Wout to prevent a belt slippage on the secondary pulley 64. As shown in FIG. 3, at a stage until a point t1 of time and a stage from a point t3 of time, namely, in the steady state in which the target gear ratio γcvttgt is constant with the primary gear-ratio changing thrust ΔWin is zero, the primary thrust Win consists of only the primary balance thrust Winb1 (=Wout/τ). At a stage from the point t1 of time until the point t3 of time, namely, in the shift-up state in which the target gear ratio γcvttgt is reduced, the primary thrust Win corresponds to a sum of the primary balance thrust Winb1 and the primary gear-ratio changing thrust ΔWin, as shown in FIG. 4. In FIG. 4, a hatched portion of each of the primary and secondary thrusts Win, Wout corresponds to a corresponding one of the primary and secondary balance thrusts Winb1, Woutb1 that are required at the point t2 of time shown in FIG. 3 to maintain the target gear ratio γcvttgt.

Figure 5:
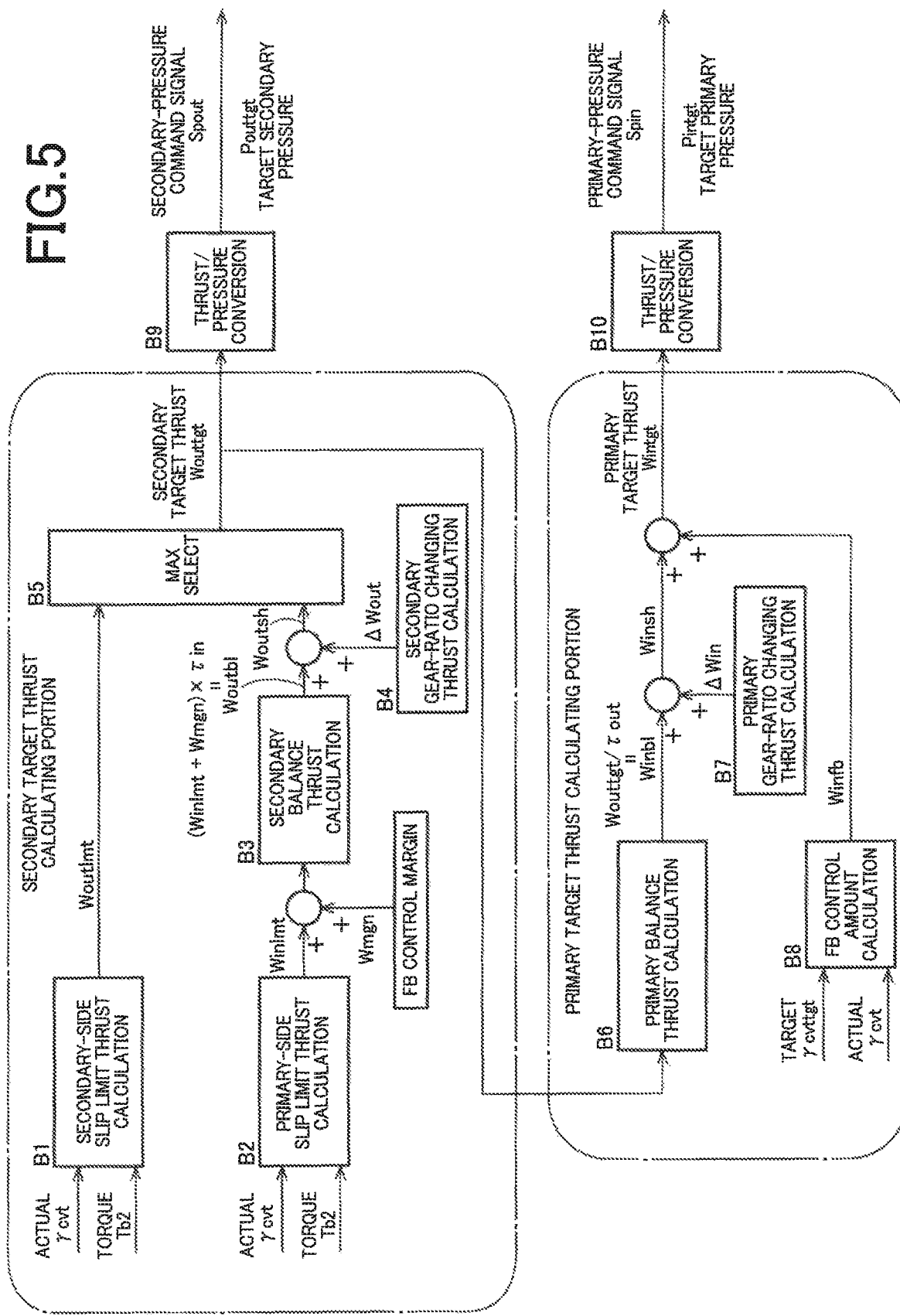
FIG. 5 is a block diagram showing an arrangement for controls performed to prevent a belt slippage and establish a target gear ratio, with minimally required thrusts.

FIG. 5 is a block diagram showing an arrangement for controls performed to execute a desired shifting action and prevent a belt slippage, with minimally required thrusts, and is for explaining a CVT hydraulic control operation as the hydraulic control operation executed in the continuously-variable transmission mechanism 24.

In FIG. 5, the transmission shifting control portion 94 calculates the target gear ratio γcvttgt. Specifically, the transmission shifting control portion 94 calculates the target primary rotational speed Npritgt by applying the accelerator operation amount θacc and the vehicle running speed V into a predetermined relationship in the form of a CVT shifting map. Then, the transmission shifting control portion 94 calculates, based on the target primary rotational speed Npritgt, a post-shifting target gear ratio γcvttgt1 (=Npritgt/Nsec) that is the gear ratio γcvt to be established after the shifting action executed in the continuously-variable transmission mechanism 24. In order that the shifting action is executed rapidly and smoothly, the transmission shifting control portion 94 determines the target gear ratio γcvttgt as a transient target value of the gear ratio γcvt in process of the shifting action, based on a pre-shifting gear ratio γcvt (i.e., gear ratio γcvt before the shifting action) and the post-shifting target gear ratio γcvttgt1, according to a relationship predetermined to cause the shifting action to be executed rapidly and smoothly. For example, the transmission shifting control portion 94 determines the target gear ratio γcvttgt (that is to be changed in process of the shifting action) as a function that is changed, along a curved line whose inclination is smoothly changed, toward the post-shifting target gear ratio γcvttgt1, with lapse of time from initiation of the shifting action. This smoothly curved line is, for example, a first-order lag curve or a second-order lag curve. When determining the target gear ratio γcvttgt, the shifting control portion 94 calculates the target shifting speed dγtgt, based on the target gear ratio γcvttgt as the time function. When the target gear ratio γcvttgt becomes constant upon completion of the shifting action, namely, when the continuously-variable transmission mechanism 24 is brought back into the steady state, the shifting speed dγtgt becomes zero.

The transmission shifting control portion 94 calculates an input torque inputted to the continuously-variable transmission mechanism 24, which is to be used in calculations of the primary target thrust Wintgt and secondary target thrust Wouttgt. More precisely, the transmission shifting control portion 94 calculates, as the input torque, a first input torque (first belt-portion input torque) that is to be used in calculation of the thrust ratio τ for establishing the target gear ratio γcvttgt of the continuously-variable transmission mechanism 24 and a second input torque (second belt-portion input torque) that is to be used in calculation of the primary-side slip limit thrust Winlmt and the secondary-side slip limit thrust Woutlmt. In the following descriptions relating to the present embodiment, the first input torque will be referred to as "thrust-ratio-calculation input torque Tb1" and the second input torque will be referred to as "belt-slippage-prevention input torque Tb2".

Specifically, the transmission-shifting control portion 94 calculates an estimated value of the engine torque Te, for example, by applying the throttle opening degree tap and the engine rotational speed Ne to a predetermined relationship such as an engine torque map. The transmission-shifting control portion 94 calculates a turbine torque Tt, based on the estimated value of the engine torque Te and a predetermined relationship such as characteristic of the torque converter 20. The calculated turbine torque Ti is an estimated value of the input torque inputted to the continuously-variable transmission mechanism 24. The transmission-shifting control portion 94 handles or regards the turbine torque it as the thrust-ratio-calculation input torque Tb1.

Basically, the thrust-ratio-calculation input torque Tb1 may be handled as the belt-slippage-prevention input torque Tb2. However, in view of variation or the like, it is not preferable that the slip limit thrust Wlmt is set to zero when the thrust-ratio-calculation input torque Tb1 is zero. Therefore, as the belt-slippage-prevention input torque Tb2, a torque value, which is obtained through a lower-limit guard processing applied to an absolute value of the thrust-ratio-calculation input torque Tb1, is used. The transmission-shifting control portion 94 selects, as the belt-slippage-prevention input torque Tb2, a larger one of the absolute value of the thrust-ratio-calculation input torque Tb1 and a minimally required torque Tblim. The minimally required torque Tblim is a positive value that is predetermined as a lower limit value, for increasing the belt-slippage-prevention input torque Tb2 so as to more reliably prevent a belt slippage in view of a variation. It is noted that, when the thrust-ratio-calculation input torque Tb1 is a negative vale, a torque value dependent on the thrust-ratio-calculation input torque Tb1 may be used as the belt-slippage-prevention input torque Tb2, in view of a low torque accuracy (i.e., low accuracy of an obtained value of each torque). This torque value dependent on the thrust-ratio-calculation input torque Tb1 is, for example, a positive value that is larger than an absolute value of the thrust-ratio-calculation input torque Tb1. Thus, the belt-slippage-prevention input torque Tb2 is a torque value that is based on the thrust-ratio-calculation input torque Tb1.

At each of blocks B1 and B2 shown in FIG. 5, the transmission shifting control portion 94 calculates the slip limit thrust Wlmt, based on the actual gear ratio γcvt and the belt-slippage-prevention input torque Tb2. Specifically, the transmission shifting control portion 94 calculates the secondary-side slip limit thrust Woutlmt, by using an equation (1) given below, and calculates the primary-side slip limit thrust Winlmt, by using an equation (2). In the equations (1) and (2), "Tb2" represents the belt-slippage-prevention input torque Tb2; "τout" represents a torque (=γcvt*Tb2=(Rout/Rin)*Tb2) that is obtained by multiplying the belt-slippage-prevention input torque Tb2 by the gear ratio γcvt; "α" represents a sheave angle of each of the pulleys 60, 64 (see FIG. 2), "μin" represents an element/pulley friction coefficient in the primary pulley 60 (i.e., friction coefficient between the transmission belt 66 and the primary pulley 60), "pout" represents an element/pulley friction coefficient in the secondary pulley 64 (i.e., friction coefficient between the transmission belt 66 and the secondary pulley 64), "Rin" represents ½ of the belt winding diameter (effective diameter) of the primary pulley 60, which is uniquely calculated based on the actual gear ratio γcvt (see FIG. 2), and "Rout" represents ½ of the belt winding diameter (effective diameter) of the secondary pulley 64, which is uniquely calculated based on the actual gear ratio γcvt (see FIG. 2).

$$Woutlmt = (Tout * \cos\alpha) / (2 * \mu out * Rout) \quad (1)$$
$$= (Tb2 * \cos\alpha) / (2 * \mu out * Rin)$$
$$Winlmt = (Tb2 * \cos\alpha) / (2 * \mu in * Rin) \quad (2)$$

As the slip limit thrust Wlmt, a value obtained through a lower-limit guard processing applied to the calculated slip limit thrust Wlmt is used. The transmission-shifting control portion 94 selects, as the primary-side slip limit thrust Winlmt to be used at block B3 shown in FIG. 5, a larger one of the primary-side slip limit thrust Winlmt (that is calculated in the above equation (2)) and a primary-side minimum thrust Winmin. The primary-side minimum thrust Winmin is a hard limit minimum thrust which is to be applied to the primary pulley 60 and which includes a thrust generated as a control variation amount of the primary pressure Pin and a thrust generated by a centrifugal hydraulic pressure in the primary hydraulic actuator 60c. The control variation amount of the primary pressure Pin is a predetermined maximum value of the primary pressure Pin, which could be supplied from the hydraulic control unit 46 into the hydraulic actuator 60c even when the primary-pressure command signal Spin requesting the primary pressure Pin to be zero. Substantially the same description is applied to the secondary-side slip limit thrust Woutlmt as well.

At each of blocks B3 and B6 shown in FIG. 5, the transmission shifting control portion 94 calculates the balance thrust Wb1. That is, the transmission shifting control portion 94 calculates the secondary balance thrust Woutb1 based on the primary-side slip limit thrust Winlmt, and calculates the primary balance thrust Winb1 based on the secondary target thrust Wouttgt.

Specifically, the transmission shifting control portion 94 calculates a thrust ratio τin that corresponds to or establishes the target gear ratio γcvttgt, for example, by applying the target gear ratio γcvttgt and a reciprocal. SFin (=Winlmt/Win) of a primary-side safety factor SFin (=Win/Winlmt) to a thrust ratio map (τin) shown in FIG. 6. The thrust ratio map (τin) is a predetermined relationship between the reciprocal $SFin^{-1}$ of the primary-side safety factor SFin and the thrust ratio τin, with a parameter in the form of the target gear ratio γcvttgt. The thrust ratio τin is a secondary-thrust calculation thrust ratio that is used to calculate the thrust applied to the secondary pulley 64, based on the thrust applied to the primary pulley 60. The transmission shifting control portion 94 calculates the secondary balance thrust Woutb1 based on the primary-side slip limit thrust Winlmt and the thrust ratio τin, by using equation (3) given below. The primary-side safety factor SFin is represented by, for example, "Win/Winlmt" or "Tb2/Tb1", and the reciprocal $SFin^{-1}$ of the primary-side safety factor SFin is represented by, for example, "Winlmt/Win" or "Tb1/Tb2". Further, the transmission shifting control portion 94 calculates a thrust ratio τout that corresponds to or establishes the target gear ratio γcvttgt, for example, by applying the target gear ratio γcvttgt and a reciprocal SFout (=Woutlmt/Wout) of a secondary-side safety factor SFout (=Wout/Woutlmt) to a thrust ratio map (τout) shown in FIG. 7. The thrust ratio map (τout) is a predetermined relationship between the reciprocal $SFout^{-1}$ of the secondary-side safety factor SFout and the thrust ratio τout, with a parameter in the form of the target gear ratio γcvttgt. The thrust ratio τout is a primary-thrust calculation thrust ratio that is used to calculate the thrust applied to the primary pulley 60, based on the thrust applied to the secondary pulley 64. The transmission shifting control portion 94 calculates the primary balance thrust Winb1 based on the secondary target thrust Wouttgt and the thrust ratio τout, by using equation (4) given below. The secondary-side safety factor SFout is represented by, for example, "Wout/Woutlmt" or "Tb2/Tb1", and the reciprocal $SFout^{-1}$ of the secondary-side safety factor Snout is represented by, for example, "Woutlmt/Wout" or "Tb1/Tb2". Since the belt-slippage-prevention input torque Tb2 is always a positive value, when the vehicle 10 is in a driving state (i.e., a state in which the vehicle 10 drives itself) in which the thrust-ratio-calculation input torque Tb1 is a positive value, a driving-state range of the thrust ratio t is used, because each of the reciprocals $SFin^{-1}$, $SFout^{-1}$ of the respective safety factors SFin, SFout is also a positive value when the vehicle 10 is in the driving state. On the other hand, when the vehicle 10 is in a driven state in which the thrust-ratio-calculation input torque Tb1 is a negative value, a driven-state range of the thrust ratio τ is used, because each of the reciprocals $SFin^{-1}$, $SFout^{-1}$ of the respective safety factors SFin, SFout is also a negative value when the vehicle 10 is in the driven state. Each of the reciprocals $SFin^{-1}$, $SFout^{-1}$ may be calculated each time when the balance thrust Wb1 is to be calculated. Or alternatively, where each of the safety factors SFin, SFout is set to a predetermined value (e.g., about 1.0-1.5), each of the reciprocals $SFin^{-1}$, $SFout^{-1}$ may be reciprocals of such safety factor set to the predetermined value.

$$Woutb1=Winlmt*\tau in \quad (3)$$

$$Winb1=Wouttgt/\tau out \quad (4)$$

As described above, each of the slip limit thrusts Winlmt, Woutlmt is calculated based on the belt-slippage-prevention input torque Tb2 that is based on the thrust-ratio-calculation input torque Tb1. The reciprocals $SFin^{-1}$, $SFout^{-1}$ of the respective safety factors SFin, SFout, based on which the thrust ratios τin, τout are calculated, are values based on the thrust-ratio-calculation input torque Tb1. Therefore, the transmission shifting control portion 94 calculates, based on the thrust-ratio-calculation input torque Tb1, the thrust ratio t that corresponds to or establishes the target gear ratio γcvttgt of the continuously-variable transmission mechanism 24.

At each of blocks B4 and B7 shown in FIG. 5, the transmission shifting control portion 94 calculates the gear-ratio changing thrust ΔW. That is, the transmission shifting control portion 94 calculates the secondary gear-ratio changing thrust ΔWout and the primary gear-ratio changing thrust ΔWin.

Figure 8:
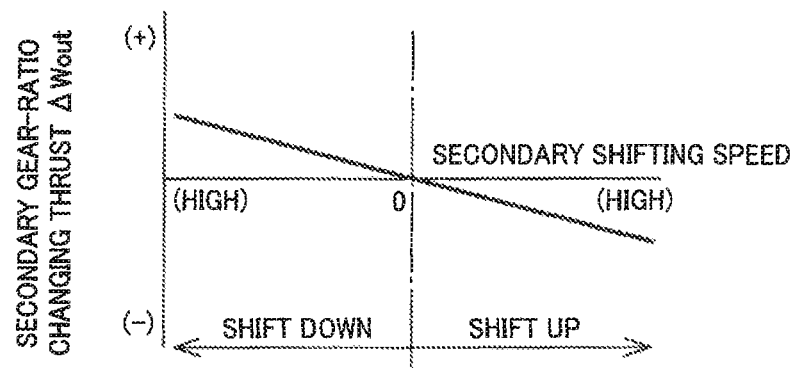
FIG. 8 is a view showing, by way of example, a gear-ratio-changing thrust map for calculating a secondary gear-ratio changing thrust.
Figure 9:
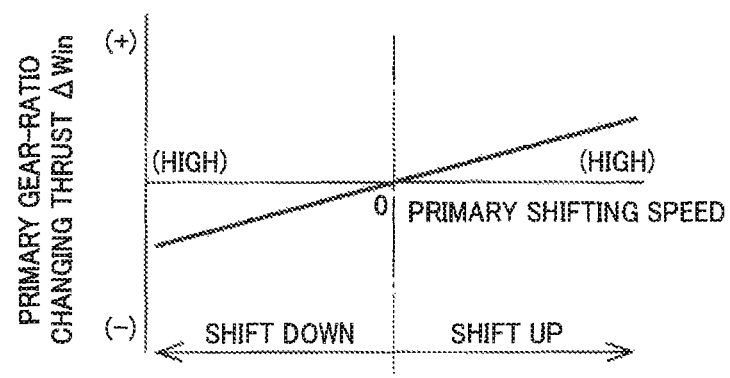
FIG. 9 is a view showing, by way of example, a gear-ratio-changing thrust map for calculating a primary gear-ratio changing thrust.

Specifically, the transmission shifting control portion 94 calculates the secondary gear-ratio changing thrust ΔWout, for example, by applying the secondary target shifting speed dγouttgt to a gear-ratio-changing thrust map (ΔWout) shown in FIG. 8. The gear-ratio-changing thrust map (ΔWout) represents, by way of example, a predetermined relationship between the secondary Shifting speed dγout and the secondary gear-ratio changing thrust ΔWout. The transmission shifting control portion 94 calculates, as the secondary thrust required to prevent a belt slippage on the primary pulley 60, a secondary-side shifting-control thrust Woutsh (=Woutb1+ΔWout), by adding the secondary gear-ratio changing thrust ΔWout to the secondary balance thrust Woutb1. Further, the transmission shifting control portion 94 calculates the primary gear-ratio changing thrust ΔWin, for example, by applying the primary target shifting speed dγintgt to a gear-ratio-changing thrust map (ΔWin) shown in FIG. 9. The gear-ratio-changing thrust map (ΔWin) represents, by way of example, a predetermined relationship between the primary shifting speed dγin and the primary gear-ratio changing thrust ΔWin. The transmission shifting control portion 94 calculates a primary-side shifting-control thrust Winsh (=Winb1+ΔWin), by adding the primary gear-ratio changing thrust ΔWin to the primary balance thrust Winb1.

Figure 6:
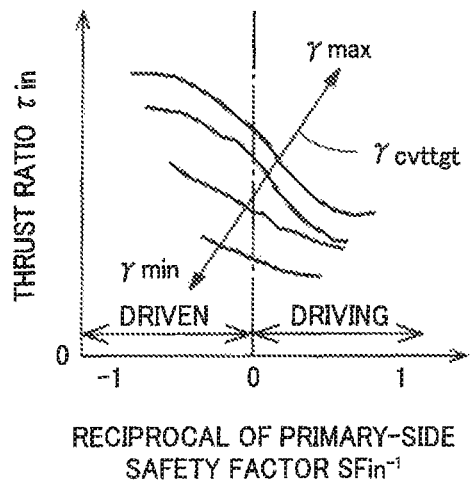
FIG. 6 is a view showing, by way of example, a thrust ratio map for calculating a thrust ratio, which is used to calculate the thrust to be applied to a secondary pulley.
Figure 7:
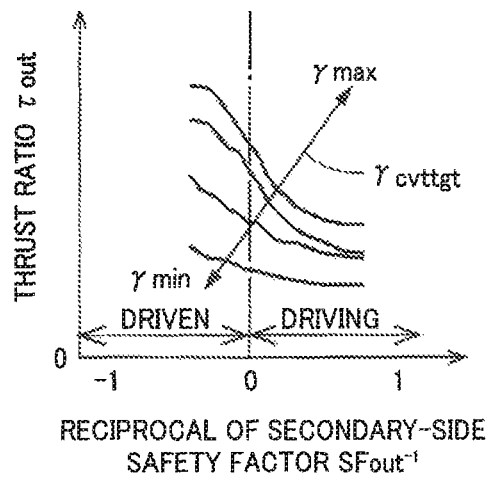
FIG. 7 is a view showing, by way of example, a thrust ratio map for calculating a thrust ratio, which is used to calculate the thrust to be applied to a primary pulley.

In calculations made at the above-described blocks B3 and B4, a predetermined physical characteristic diagram such as the thrust ratio map (τin) shown in FIG. 6 and the gear-ratio-changing thrust map (ΔWout) shown in FIG. 8 is used. Therefore, in a result of calculation of each of the secondary balance thrust Woutb1 and the secondary gear-ratio changing thrust ΔWout, there exists a variation that is dependent on an individual difference of a hard unit such as the hydraulic control unit 46 in terms of physical characteristics. Where such a variation in terms of the physical characteristics is taken into consideration, the shifting control portion 94 may add a control margin Wmgn to the primary-side slip limit thrust Winlmt. The control margin Wmgn is a predetermined thrust that corresponds to the variation in terms of the physical characteristics which could affect the calculation of each of the secondary balance thrust Woutb1 and the secondary gear-ratio changing thrust ΔWout. Where the variation in terms of the physical characteristics is taken into consideration, the transmission-shifting control portion 94 calculates the secondary balance thrust Woutb1 by using an equation "Woutb1=(Winlmt+Wmgn)*τin" shown in FIG. 5 in place of the above-described equation (3). It is noted that the calculation could be affected by the variation in terms of the physical characteristics as well as the variation in term of an actual value of the pulley hydraulic-pressure that is generated in response to the hydraulic-control command signal Scvt, and that the calculation could be affected by the variation in terms of the physical characteristics by a degree, which could be relatively large depending on a kind of hard unit (such as the hydraulic control unit 46) having the individual difference. However, in general, the degree by which the calculation could be affected by the variation in the physical characteristics is extremely small as compared with a degree by which the calculation could be affected by the variation in the actual value of the pulley hydraulic-pressure.

At block B5 shown in FIG. 5, the transmission shifting control portion 94 selects, as the secondary target thrust Wouttgt, a larger one of the secondary-side slip limit thrust Woutlmt and the secondary-side shifting-control thrust Woutsh.

At block B8 shown in FIG. 5, the transmission shifting control portion 94 calculates a feedback control amount Winfb. Specifically, the transmission shifting control portion 94 calculates a feedback control amount (=FB control amount) Winfb that makes the actual gear ratio γcvt coincident with the target gear ratio γcvttgt, by using a feedback-control formula in the form of equation (5) given below. In the equation (5), "Δγcvt" represents the gear ratio deviation Δγcvt, "Kp" represents a predetermined proportionality constant, "Ki" represents a predetermined integral constant, and "Kd" represents a predetermined differential constant. The transmission shifting control portion 94 calculates, as the primary target thrust Wintgt, an amended value (=Winsh+Winfb) of the feedback control amount Winfb that is amended by a feedback control, by adding the feedback control amount Winfb to the primary-side shifting-control thrust Winsh.

$$\text{Winfb}=Kp*\Delta\gamma cvt+Ki*(\int\Delta\gamma cvtdt)+Kd*(d\Delta\gamma cvt/dt) \quad (5)$$

At each of blocks B9 and B10 shown in FIG. 5, the transmission shifting control portion 94 converts the target thrust into a target pulley pressure. Specifically, the transmission shifting control portion 94 converts the primary target thrust Wintgt into a target primary pressure Pintgt (=Wintgt/pressure receiving area), based on the pressure receiving area of the primary hydraulic actuator 60c, and converts the secondary target thrust Wouttgt into a target secondary pressure Pouttgt (=Wouttgt/pressure receiving area), based on the pressure receiving area of the secondary hydraulic actuator 64c. The transmission shifting control portion 94 sets the primary-pressure command signal. Spin representing the target primary pressure Pintgt and the secondary-pressure command signal Spout representing the target secondary pressure Pouttgt.

The transmission shifting control portion 94 supplies the hydraulic-control command signal Scvt in the form of the primary-pressure command signal Spin and the secondary-pressure command signal Spout, to the hydraulic control unit 46, for thereby obtaining the target primary pressure Pintgt and the target secondary pressure Pouttgt. The hydraulic control unit 46 regulates the primary pressure Pin and the secondary pressure Pout, in accordance with the supplied hydraulic-control command signal Scvt.

In the drive-force transmitting apparatus 16, the operation state of the second clutch C2 is to be switched among a plurality of states depending on, for example, the running mode of the vehicle 10, wherein the plurality of states include at least four states consisting of a fully released state, a fully engaged state, a releasing process state and an engaging process state. The second clutch C2 is placed in the fully engaged state during the belt running mode, and is placed in the fully released state during the gear running mode. Further, during the switching control operation executed for switching the running mode between the gear running mode and the belt running mode, the second clutch C2 is temporarily placed in the releasing process state or the engaging process state. Moreover, during a garage operation that is executed by operation of the shift lever 84 between the neutral position N and the drive position ID, too, the second clutch C2 is temporarily placed in the releasing process state or the engaging process state. The input torque inputted to the continuously-variable transmission mechanism 24 is changed with change of the operation state of the second clutch C2. That is, the input torque inputted to the continuously-variable transmission mechanism 24 is dependent on the operation state of the second clutch C2.

It is preferable to establish the target gear ratio γcvttgt of the continuously-variable transmission mechanism 24 while preventing a belt slippage in the continuously-variable transmission mechanism 24, not only in a belt-running-mode situation in which the vehicle 10 is running in the belt running mode, but also in other situations other than the belt-running-mode situation. To this end, the transmission shifting control portion 94 calculates the input torque inputted to the continuously-variable transmission mechanism 24, which is used in calculation of the primary target thrust Wintgt and the secondary target thrust Wouttgt, depending on the operation state of the second clutch C2. That is, the transmission shifting control portion 94 calculates the thrust-ratio-calculation input torque Tb1 and the belt-slippage-prevention input torque Tb2, depending on the operation state of the second clutch C2. For example, when the second clutch C2 is in the fully engaged state, the turbine torque Tt is handled or regarded as the thrust-ratio-calculation input torque Tb1, and a larger one of the absolute value of the thrust-ratio-calculation input torque Tb1 and the minimally required torque Tblim is handled or regarded as the belt-slippage-prevention input torque Tb2, as in a method of calculation of the primary target thrust Wintgt and secondary target thrust Wouttgt, which has been described above, by way of example, when the vehicle 10 is in the belt running mode. Namely, when the second clutch C2 is in the fully engaged state, the transmission shifting control portion 94 sets the turbine torque Tt as the thrust-ratio-calculation input torque Tb1, and sets the larger one of the absolute value of the turbine torque Tt and the minimally required torque Tblim, as the belt-slippage-prevention input torque Tb2. Further, when the second clutch C2 is in the releasing process state or in the engaging process state, the transmission-shifting control portion 94 handles or regards a converted value of the torque capacity of the second clutch C2 converted on the primary shaft 58, as the thrust-ratio-calculation input torque Tb1, namely, sets the converted value as the thrust-ratio-calculation input torque Tb1. The torque capacity of the second clutch C2 is calculated based on the hydraulic-control command signal Scbd. Further, when the second clutch C2 is fully released, the transmission-shifting control portion 94 sets the thrust-ratio-calculation input torque Tb1 to zero, for example. Regarding the belt-slippage-prevention input torque Tb2, the transmission-shifting control portion 94 sets the belt-slippage-prevention input torque Tb2 to a larger one of the absolute value of the thrust-ratio-calculation input torque Tb1 and the minimally required torque Tblim, not only when the second clutch C2 is in the fully engaged state but also when the second clutch C2 in the other states.

As described above, each of the thrust-ratio-calculation input torque Tb1 and belt-slippage-prevention input torque Tb2 is calculated to a value that is dependent on the operation state of the second clutch C2. Therefore, the operation state of the second clutch C2 needs to be accurately determined, for preventing a belt slippage and assuring a high followability of the actual gear ratio γ with respect to the target gear ratio γcvttgt in the continuously-variable transmission mechanism 24.

The electronic control apparatus 90 further includes an operation-state determining means or portion in the form of an operation-state determining portion 96, for performing control operations to accurately determine the operation state of the second clutch C2.

The operation-state determining portion 96 determines which one of the four states (that consist of the fully released state, fully engaged state, releasing process state and engaging process state) is established as the operation state of the second clutch C2, by determining whether a plurality of transition-completion conditions, each of which is to be satisfied to determine that a transition of the operation state of the second clutch C2 to a corresponding one of the four states from another of the four states has been completed, are satisfied or not, based on (α) a state of the hydraulic control executed to control the hydraulic pressure supplied to the second clutch C2 and (β) a rotational speed difference ΔNc2 of the second clutch C2. That is, the operation-state determining portion 96 determines in which one of the four states the second clutch C2 is placed, depending on a result of the determination as to which one of the plurality of transition-completion conditions is satisfied. The operation-state determining portion 96 obtains or determines the state of the hydraulic control executed for the second clutch C2, based on the hydraulic-control command signal Scbd. Further, the operation-state determining portion 96 calculates the rotational speed difference ΔNc2 (=Nsec−Nout) in the second clutch C2, based on the secondary rotational speed Nsec and the output-shaft rotational speed Nout. In the following descriptions relating to the present embodiment, the rotational speed difference ΔNc2 in the second clutch C2 will be referred to as "C2 rotational speed difference ΔNc2".

The state of the hydraulic control executed for the second clutch C2 is represented by, for example, a tendency that the hydraulic pressure supplied to the second clutch C2 is being increased or reduced and/or a level of a command value of the hydraulic pressure supplied to the second clutch C2 in the hydraulic control. The C2 rotational speed difference ΔNc2 corresponds to an actual state representing how the second clutch C2 is actually operated.

The above-described hydraulic control is executed to engage or release the second clutch C2, by controlling the hydraulic pressure supplied to the second clutch C2. In the following descriptions of the present embodiment, the hydraulic control will be referred to as "C2 engaging hydraulic control" when the hydraulic control is executed to engage the second clutch C2, and will be referred to as "C2 releasing hydraulic control" when the hydraulic control is executed to release the second clutch C2. Further, a command value of the hydraulic pressure supplied to the second clutch C2, which is in accordance with the hydraulic-control command signal Scbd, will be referred to as "C2 command pressure value", while an actual value of the hydraulic pressure actually supplied to the second clutch C2 from the hydraulic control unit 46 will be referred to as "C2 actual pressure value".

The C2 engaging hydraulic control is executed, for example, when a first state of the drive-force transmitting apparatus 16 in which the first drive-force transmitting path PT1 is established is to be switched to a second state of the drive-three transmitting apparatus 16 in which the second drive-force transmitting path PT2 is established. When being executed to switch from the first state of the drive-force transmitting apparatus 16 to the second state of the drive-force transmitting apparatus 16, the C2 engaging hydraulic control constitutes a part of the switching control operation, which is executed for switching the running mode from the gear running mode to the belt running mode, by performing a so-called "clutch to clutch" shifting operation so as to release and engage the first and second clutches C1, C2, respectively. Further, the C2 engaging hydraulic control is executed, for example, when the neutral state of the drive-force transmitting apparatus 16 is to be switched to the second state of the drive-force transmitting apparatus 16 in which the second drive-three transmitting path PT2 is established. When being executed to switch from the neutral state to the drive-force transmitting apparatus 16 to the second state of the drive-force transmitting apparatus 16, the C2 engaging hydraulic control constitutes a garage engaging control, which is executed for engaging the second clutch C2, in response to a garage operation executed by operation of the shift lever 84 from the neutral position N to the drive position D in the belt running mode.

The C2 releasing hydraulic control is executed, for example, when the second state of the drive-force transmitting apparatus 16 in which the second drive-force transmitting path PT2 is established is to be switched to the first state of the drive-force transmitting apparatus 16 in which the first drive-force transmitting path PT1 is established. When being executed to switch from the second state of the drive-force transmitting apparatus 16 to the first state of the drive-force transmitting apparatus 16, the C2 releasing hydraulic control constitutes a part of the switching control operation, which is executed for switching the running mode from the belt running mode to the gear running mode, by performing a so-called "clutch to clutch" shifting operation so as to release the second clutch C2 and engage the first clutch C1. Further, the C2 releasing hydraulic control is executed, for example, when the second state of the drive-force transmitting apparatus 16 in which the second drive-force transmitting path PT2 is established is to be switched to the neutral state of the drive-force transmitting apparatus 16. When being executed to switch from the second state of the drive-force transmitting apparatus 16 to the neutral state to the drive-force transmitting apparatus 16, the C2 releasing hydraulic control constitutes a garage releasing control, which is executed for releasing the second clutch C2, in response to a garage operation executed by operation of the shift lever 84 from the drive position D to the neutral position N in the belt running mode.

Figure 10:
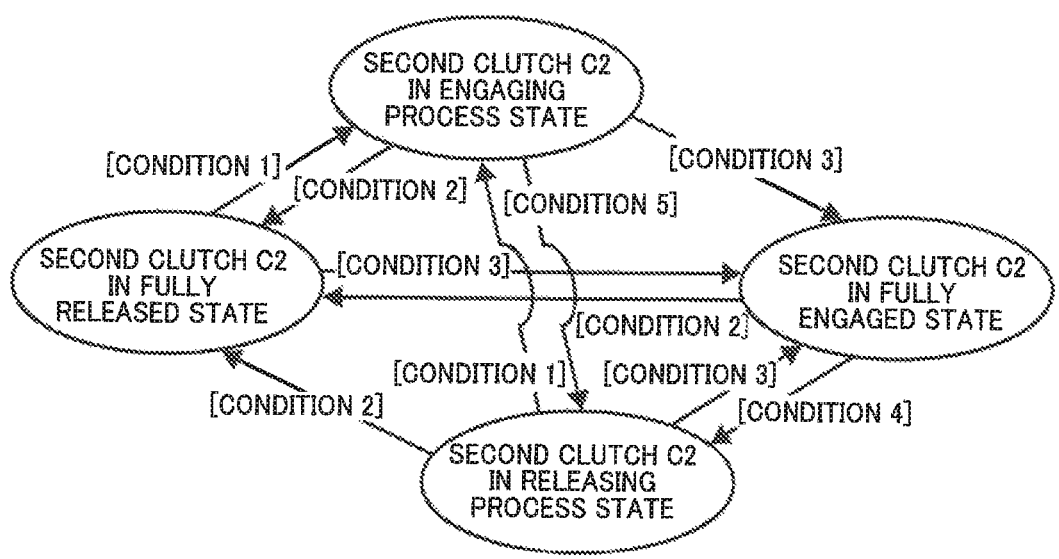
FIG. 10 is a state-transition diagram showing an operation state of the second clutch that is to be switched among four states in the form of a fully released state, a fully engaged state, a releasing process state and an engaging process state, and a plurality of transition-completion conditions each of which is required to determine that a transition of the operation state of the second clutch to a corresponding one of the four states from another of the four states has been completed.

FIG. 10 is a state-transition diagram showing the operation state of the second clutch C2 that is to be switched among four states in the form of the fully released state, fully engaged state, releasing process state and engaging process state, and the plurality of transition-completion conditions each of which is required to determine that a transition of the operation state of the second clutch C2 to a corresponding one of the four states from another of the four states has been completed. Namely, the state-transition diagram of FIG. 10 shows relationship between the operation state of the second clutch C2 and the transition-completion conditions. It is noted that the state-transition diagram of FIG. 10 is also for explaining a main part of a control operation executed by the electronic control apparatus 90, namely, a control operation that is executed for determining the operation state of the second clutch C2 with improved accuracy.

As shown in FIG. 10, when the second clutch C2 had been in the fully released state or releasing process state, if [CONDITION 1] (corresponding to "first condition" recited in the appended claims) as one of the transition-completion conditions is satisfied, it is determined that the operation state of the second clutch C2 has been switched to the engaging process state, namely, the engaging process state is established as the operation state of the second clutch C2. In process of engagement of the second clutch C2 in the C2 engaging hydraulic control, an actual output of the hydraulic pressure to the second clutch C2 is increased with delay in response to an increase of the C2 command pressure value, so that a relationship represented by "C2 command pressure value>C2 actual pressure value" is assured. Further, when it is determined that the second clutch C2 is in placed in the engaging process state, the thrust-ratio-calculation input torque Tb1 is set to a torque value corresponding to the torque capacity of the second clutch C2 that is calculated based on the hydraulic-control command signal Scbd. Thus, even where it is determined that the operation state of the second clutch C2 has been switched to the engaging process state, by only a fact that the C2 engaging hydraulic control is being executed, it is possible to assure the belt torque capacity Tcvt.

Therefore, the above-described [CONDITION 1] is that the C2 engaging hydraulic control is operated, namely, the hydraulic-control command signal Scbd for executing the C2 engaging hydraulic control is outputted. When the second clutch C2 had been in the fully released state or in the releasing process state, if the [CONDITION 1], which is that the C2 engaging hydraulic control is operated, is satisfied, the operation-state determining portion 96 determines that the operation state of the second clutch C2 has been switched to the engaging process state, namely, the engaging process state is established as the operation state of the second clutch C2.

When the second clutch C2 had been in the fully engaged state, releasing process state or engaging process state, if [CONDITION 2] (corresponding to "second condition" recited in the appended claims) as one of the transition-completion conditions is satisfied., it is determined that the operation state of the second clutch C2 has been switched to the fully released state, namely, the fully released state is established as the operation state of the second clutch C2. As long as, in addition to the fact that the C2 releasing hydraulic control is executed, the C2 rotational speed difference ΔNc2 has become large with the C2 command pressure value in the C2 releasing hydraulic control being not higher than a pressure value that causes the second clutch C2 to be placed in the fully released state, there is unlikely to be a problem even if it is determined that the operation state of the second clutch C2 has been switched to the fully released state. However, this determination can be made when the input-shaft rotational speed Nin (=primary rotational speed Npri=rotational speed of turbine impeller 20*t*) as the input rotational speed of the continuously-variable transmission mechanism 24 is in a high speed range. When the input-shaft rotational speed Nin is in a low range, the C2 rotational speed difference ΔNc2 could be difficult to be detected. For example, when the switching control operation is executed to switch the running mode from the belt running mode to the gear running mode during stop of the vehicle 10, the C2 rotational speed difference ΔNc2 cannot be detected because the input-shaft rotational speed Nin is not increased as a result of engagement of the first clutch C1 after release of the second clutch C2. Thus, when the input-shaft rotational speed Nin is in a low speed range, it is determined that the operation state of the second clutch C2 has been switched to the fully released state upon reduction of the C2 command pressure value to a value that is low enough to ensure the fully released state of the second clutch C2 in the C2 releasing hydraulic control. Further, in addition to the above-described manners for the determination, it may be determined that the operation state of the second clutch C2 has been switched to the fully released state when it is assured that the drive-force transmitting apparatus 16 is placed in the neutral state. For example, in an arrangement with a known manual valve that is provided in the hydraulic control unit 46 to be operated in association with operation of the shift lever 84, an original pressure of the hydraulic pressure supplied to the second clutch C2 becomes not to be supplied to the hydraulic control unit 46 by placement of the shift lever 84 in the neutral position N, whereby the hydraulic pressure supplied to the second clutch C2 is reduced and accordingly the second clutch C2 is released. It is noted that where the C2 releasing hydraulic control is operated by the placement of the shift lever 84 in the neutral position N, the above-described manners with operation of the C2 releasing hydraulic control may be used.

Therefore, the above-described [CONDITION 2] includes first, second and third requirement options. The first requirement option is that (i) the C2 releasing hydraulic control is operated, namely, the hydraulic-control command signal Scbd for executing the C2 releasing hydraulic control is outputted, (ii) the input-shaft rotational speed Nin has been kept not lower than a predetermined speed value Ninf for at least a predetermined length TM1 of time, (iii) the C2 command pressure value in the C2 releasing hydraulic control has been kept not higher than a first predetermined pressure value for at least the predetermined length TM1 of time and (iv) the C2 rotational speed difference ΔNc2 has been kept higher than a first predetermined difference value ΔNc2f1 for at least the predetermined length TM1 of time. The second requirement option is that (i) the C2 releasing hydraulic control is operated, (ii) the input-shaft rotational speed Nin has been kept lower than the predetermined speed value Ninf for at least a predetermined length TM2 of time and (iii) the C2 command pressure value in the C2 releasing hydraulic control has been kept not higher than a second predetermined pressure value for at least the predetermined length TM2 of time. The third requirement option is that (iii) it is assured that the drive-force transmitting apparatus 16 is placed in the neutral state, for example, a predetermined length TM3 of time has passed after the shift lever 84 has been placed in the in the neutral position N.

The above-described predetermined speed value Ninf is, for example, a lower limit value of a predetermined range of the input-shaft rotational speed Nin, which enables detection of the C2 rotational speed difference ΔNc2 that is used in determination of the fully released state of the second clutch C2. Each of the above-described first predetermined pressure value, second predetermined pressure value, first predetermined difference value ΔNc2f1, predetermined length TM1 of time, predetermined length TM2 of time and predetermined length TM3 of time is, for example, a predetermined threshold value for determining that the second clutch C2 is in the fully released state. The second predetermined pressure value is lower than the first predetermined pressure value, and is, for example, a predetermined upper limit value of a predetermined range of the C2 command pressure value, which ensures that the second clutch C2 is in the fully released state.

When the second clutch C2 had been in the fully engaged state, releasing process state or engaging process state, if any one of the first through third requirement options of the [CONDITION 2] is satisfied, the operation-state determining portion 96 determines that the operation state of the second clutch C2 has been switched to the fully released state, namely, the fully released state is established as the operation state of the second clutch C2, wherein the first requirement option is that the input-shaft rotational speed. Nin is not lower than the predetermined speed value Ninf and the rotational speed difference ΔNc2 of the second clutch C2 is made higher than the first predetermined difference value ΔNc2f1 by the C2 releasing hydraulic control that is executed to release the second clutch C2 with the C2 command pressure value being not higher than the first predetermined pressure value, the second requirement option is that the input-shaft rotational speed Nin is lower than the predetermined speed value Ninf and the C2 releasing hydraulic control is executed to release the second clutch C2 with the C2 command pressure value being not higher than the second predetermined pressure value, and the third requirement option is that it is assured that the drive-force transmitting apparatus 16 is placed in the neutral state.

When the second clutch C2 had been in the fully released state, releasing process state or engaging process state, if [CONDITION 3] (corresponding to "third condition" recited in the appended claims) as one of the transition-completion conditions is satisfied, it is determined that the operation state of the second clutch C2 has been switched to the fully engaged state, namely, the fully engaged state is established as the operation state of the second clutch C2. As long as, in addition to the fact that the C2 engaging hydraulic control is executed, the C2 rotational speed difference ΔNc2 has become small with the C2 command pressure value in the C2 engaging hydraulic control being not lower than a pressure value that causes the second clutch C2 to be engaged, there is unlikely to be a problem even if it is determined the operation state of the second clutch C2 has been switched to the fully engaged state. That is, it is determined that the operation state of the second clutch C2 has been switched to the fully engaged state, when the C2 command pressure value that is controlled in the hydraulic control executed for the second clutch C2 is changed in such a way that causes the second clutch C2 to be engaged and it can be regarded that the fully engaged state is actually already established as the operation state of the second clutch C2. Further, in addition to the above-described manner for the determination, it may be determined that the operation state of the second clutch C2 has been switched to the fully engaged state, at a point of time at which the state of the hydraulic control executed for the second clutch is switched from execution of the C2 engaging hydraulic control to execution of a C2 constant hydraulic control that is executed to maintain the fully engaged state of the second clutch C2. For example, where the C2 command pressure value is increased at steps upon switching from the C2 engaging hydraulic control to the C2 constant hydraulic control, if it is still determined that the second clutch C2 is in the engaging process state, at least the thrust-ratio-calculation input torque Tb1 would be calculated to correspond to the torque capacity of the second clutch C2 that is based on the increased C2 command pressure value. Since the thus calculated thrust-ratio-calculation input torque Tb1 could be an inappropriate value, it may be determined that the operation state of the second clutch C2 has been switched to the fully engaged state, at the point of time at which the state of the hydraulic control is switched to execution of the C2 constant hydraulic control.

Therefore, the above-described [CONDITION 3] includes first and second requirement options. The first requirement option is that (i) the C2 engaging hydraulic control is operated, namely, the hydraulic-control command signal Scbd for executing the C2 engaging hydraulic control is outputted, (ii) the C2 command pressure value in the C2 engaging hydraulic control has been kept not lower than a third predetermined pressure value for at least a predetermined length TM4 of time and (iii) the C2 rotational speed difference ΔNc2 has been kept lower than a second predetermined difference value ΔNc2f2 for at least the predetermined length TM4 of time. The second requirement option is that the state of the hydraulic control executed for the second clutch C2 has been switched from execution of the C2 engaging hydraulic control to execution of the C2 constant hydraulic control. Each of the above-described third predetermined difference value, second predetermined difference value ΔNc2f2 and predetermined length TM4 of time is, for example, a predetermined threshold value for determining that the second clutch C2 is in the fully engaged state.

When the second clutch C2 had been in the fully released state, releasing process state or engaging process state, if either one of the first and second requirement options of the [CONDITION 3] is satisfied, the operation-state determining portion 96 determines that the operation state of the second clutch C2 has been switched to the fully engaged state, namely, the fully engaged state is established as the operation state of the second clutch C2, wherein the first requirement option is that the C2 rotational speed difference ΔNc2 is made lower than the second predetermined difference value ΔNc2f2 by the C2 engaging hydraulic control that is executed to engage the second clutch C2 with the C2 command pressure value being not lower than the third predetermined pressure value, and the second requirement option is that the state of the hydraulic control executed for the second clutch C2 has been switched from execution of the C2 engaging hydraulic control to the C2 constant hydraulic control.

When the second clutch C2 had been in the fully engaged state, if [CONDITION 4] (corresponding to "fourth condition" recited in the appended claims) as one of the transition-completion conditions is satisfied, it is determined that the operation state of the second clutch C2 has been switched to the releasing process state, namely, the releasing process state is established as the operation state of the second clutch C2. As long as the C2 rotational speed difference ΔNc2 is increased in addition to the fact that the C2 releasing hydraulic control is executed, there is unlikely to be a problem even if it is determined the operation state of the second clutch C2 has been switched to the releasing process state. For example, when there is a failure of an electro-magnetic valve or other device provided to regulate the hydraulic pressure supplied to the second clutch C2, even if the C2 releasing hydraulic control is executed, the actual operation state of the second clutch C2 could be the fully engaged state. In such a case, the belt-slippage-prevention input torque Tb2 could be calculated to a torque value lower than the torque actually inputted to the continuously-variable transmission mechanism 24, so that there is a risk that a belt slippage could occur in the continuously-variable transmission mechanism 24. Thus, for avoiding occurrence of the belt slippage, it is not determined that the operation state of the second clutch C2 has been switched to the releasing process state, only by the fact that the C2 releasing hydraulic control is executed. The determination is made also by taking account of whether the C2 rotational speed difference ΔNc2 is increased or not.

Therefore, the above-described [CONDITION 4] is that (i) the C2 releasing hydraulic control is operated and (ii) the C2 rotational speed difference ΔNc2 has been kept not lower than the third predetermined difference value ΔNc2f3 for at least a predetermined length TM5 of time. Each of the above-described third predetermined difference value ΔNc2f3 and predetermined length TM5 of time is, for example, a predetermined threshold value for determining that the second clutch C2 is in the releasing process state.

When the second clutch C2 had been in the fully engaged state, if the [CONDITION 4] is satisfied, the operation-state determining portion 96 determine that the operation state of the second clutch C2 has been switched to the releasing process state, namely, the releasing process state is established as the operation state of the second clutch C2, wherein the [CONDITION 4] is that the C2 rotational speed difference ΔNc2 is made not lower than the third predetermined difference value ΔNc2f3 by the C2 releasing hydraulic control that is executed to release the second clutch C2.

When the second clutch C2 had been in the engaging process state, if [CONDITION 5] (corresponding to "fifth condition" recited in the appended claims) as one of the transition-completion conditions is satisfied, it is determined that the operation state of the second clutch C2 has been switched to the releasing process state, namely, the releasing process state is established as the operation state of the second clutch C2. As long as the operation state of the second clutch C2 is switched from execution of the C2 engaging hydraulic control to execution of the C2 releasing hydraulic control, there is unlikely to be a problem even if it is determined the operation state of the second clutch C2 has been switched to the releasing process state. When the second clutch C2 is in the engaging process state, there is a certain amount of the C2 rotational speed difference ΔNc2. Further, when it is determined that the second clutch C2 is in placed in the engaging process state, the thrust-ratio-calculation input torque Tb1 is set to a torque value corresponding to the torque capacity of the second clutch C2 that is calculated based on the hydraulic-control command signal Scbd. Therefore, only with the fact that the C2 releasing hydraulic control is executed, it is determined that the operation state of the second clutch C2 has been switched to the releasing process state.

Therefore, the above-described [CONDITION 5] is that the C2 releasing hydraulic control is executed. When the second clutch C2 had been in the engaging process state, if the [CONDITION 5] is satisfied, the operation-state determining portion 96 determines that the operation state of the second clutch C2 has been switched to the releasing process state, namely, the releasing process state is established as the operation state of the second clutch C2, wherein the [CONDITION 5] is that the C2 releasing hydraulic control is executed to release the second clutch C2.

The transmission shifting control portion 94 calculates the input torque inputted to the continuously-variable transmission mechanism 24, which is to be used in calculations of the primary target thrust Wintgt and the secondary target thrust Wouttgt, such that the input torque is calculated depending on the operation state of the second clutch C2 that has been determined by the operation-state determining portion 96.

Figure 11:
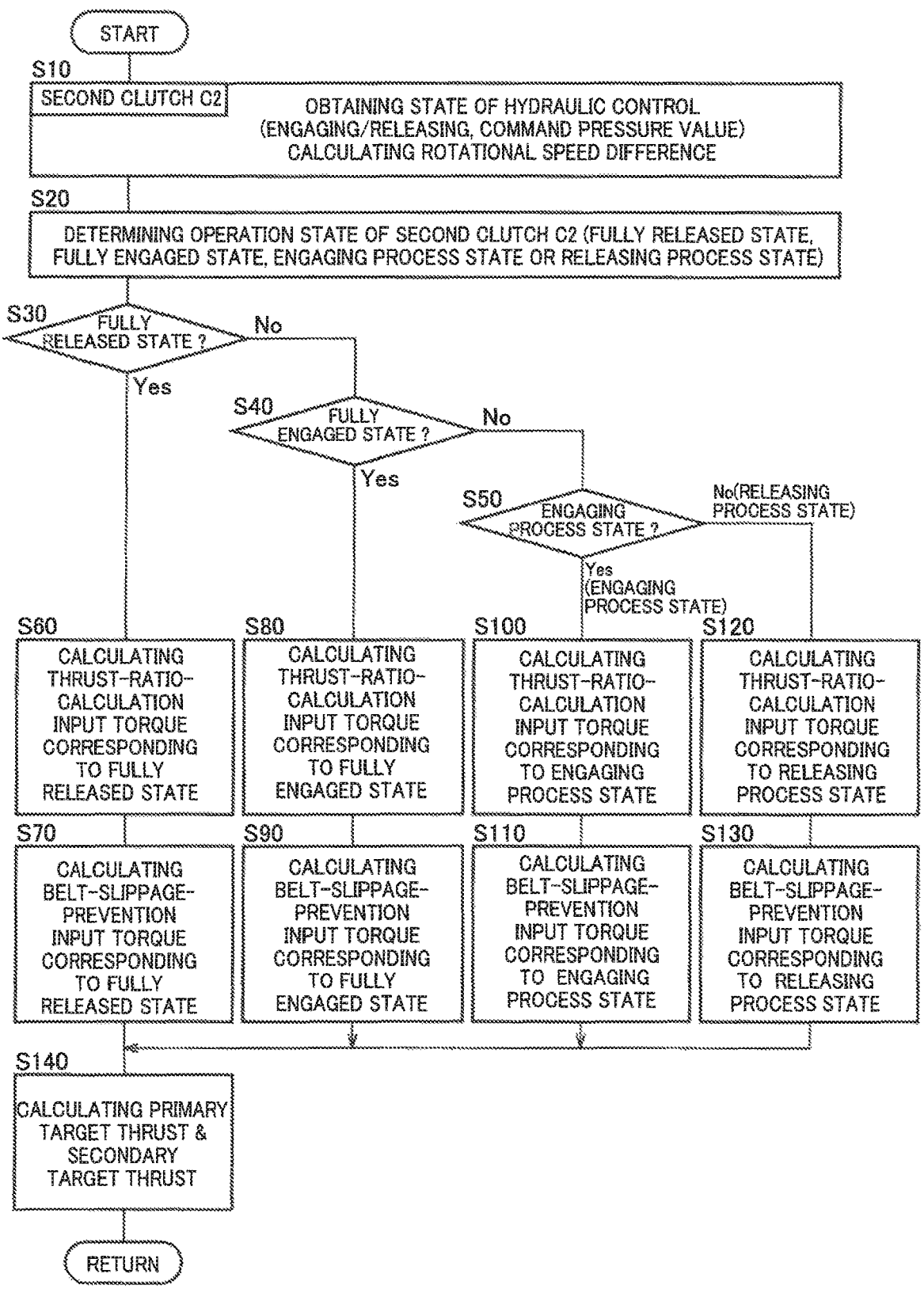
FIG. 11 is a flow chart showing a main part of a control routine executed by the control apparatus, namely, a control routine that is executed for determining the operation state of the second clutch with improved accuracy.

FIG. 11 is a flow chart showing a main part of a control routine executed by the electronic control apparatus 90, namely, a control routine that is executed for determining the operation state of the second clutch C2 with improved accuracy. This control routine is executed, for example, in a repeated manner.

As shown in FIG. 11, the control routine is initiated with step S10 corresponding to function of the operation-state determining portion 96, which is implemented to obtain the state of the hydraulic control and calculate the C2 rotational speed difference ΔNc2. Step S10 is followed by step S20 corresponding to function of the operation-state determining portion 96, which is implemented to determine the operation state of the second clutch C2, namely, determine which one of the above-described four states (i.e., fully released state, fully engaged state, releasing process state, engaging process state) is being established as the operation state of the second clutch C2 is established as the operation state of the second clutch C2, through the control operation described with reference to FIG. 10. Then, step S30 corresponding to function of the operation-state determining portion 96 is implemented to determine whether the operation state of the second clutch C2 is the fully released state or not. When a negative determination is made at step S30, the control flow goes to step S40 corresponding to function of the operation-state determining portion 96, which is implemented to determine whether the operation state of the second clutch C2 is the fully engaged state or not. When a negative determination is made at step S40, the control flow goes to step S50 corresponding to function of the operation-state determining portion 96, which is implemented to determine whether the operation state of the second clutch C2 is the engaging process state or not. When an affirmative determination is made at step S30, the thrust-ratio-calculation input torque Tb1 is calculated to a torque value corresponding to the fully released state of the second clutch C2 in step S60 corresponding to function of the transmission shifting control portion 94. Step S60 is followed by step S70 corresponding to function of the transmission shifting control portion 94, in which the belt-slippage-prevention input torque Tb2 is calculated to a torque value corresponding to the fully released state of the second clutch C2. When an affirmative determination is made at step S40, the thrust-ratio-calculation input torque Tb1 is calculated to a torque value corresponding to the fully engaged state of the second clutch C2 in step S80 corresponding to function of the transmission shifting control portion 94. Step S80 is followed by step S90 corresponding to function of the transmission shifting control portion 94, in which the belt-slippage-prevention input torque Tb2 is calculated to a torque value corresponding to the fully engaged state of the second clutch C2. When an affirmative determination is made at step S50, the thrust-ratio-calculation input torque Tb1 is calculated to a torque value corresponding to the engaging process state of the second clutch C2 in step S100 corresponding to function of the transmission shifting control portion 94. Step S100 is followed by step S110 corresponding to function of the transmission shifting control portion 94, in which the belt-slippage-prevention input torque Tb2 is calculated to a torque value corresponding to the engaging process state of the second clutch C2. When a negative determination is made at step S50, the thrust-ratio-calculation input torque Tb1 is calculated to a torque value corresponding to the releasing process state of the second clutch C2 in step S120 corresponding to function of the transmission shifting control portion 94. Step S120 is followed by step S130 corresponding to function of the transmission shifting control portion 94, in which the belt-slippage-prevention input torque Tb2 is calculated to a torque value corresponding to the releasing process state of the second clutch C2. Each of steps S70, S90, S110 and S130 is followed by step S140 corresponding to function of the transmission shifting control portion 94, which is implemented to calculate the primary target thrust Wintgt and the secondary target thrust Wouttgt through the control operation described with reference to FIG. 5.

As described above, in the present embodiment, it is determined which one of the plurality of states (including the fully released state, fully engaged state, releasing process state and the engaging process state) is established as the operation state of the second clutch C2, by determining whether the plurality of transition-completion conditions, each of which is required to determine that the transition of the operation state of the second clutch C2 to a corresponding one of the plurality of states from another of the plurality of states has been completed, are satisfied or not, based on (α) the state of the hydraulic control executed to control the hydraulic pressure supplied to the second clutch C2 and (β) the C2 rotational speed difference ΔNc2. Thus, the determination as to which one of the plurality of states is established as the operation state of the second clutch C2 is made by taking account of not only a tendency of increase or reduction of the hydraulic pressure supplied to the second clutch C2 and/or the C2 command pressure value in the hydraulic control but also how the second clutch C2 is being actually operated. It is therefore possible to determine the operation state of the second clutch C2 with improved accuracy.

In the present embodiment, the input torque inputted to the continuously-variable transmission mechanism 24, which is to be used in calculations of the primary target thrust Wintgt and the secondary target thrust Wouttgt, is calculated depending on one of the plurality of states that is determined to be established as the operation state of the second clutch C2. Thus, the continuously-variable transmission mechanism 24 can be appropriately controlled by using the input torque that corresponds to the operation state of the second clutch C2 which is determined with high accuracy.

In the present embodiment, the thrust-ratio-calculation input torque Tb1 and the belt-slippage-prevention input torque Tb2 are calculated as the input torque inputted to the continuously-variable transmission mechanism 24, whereby the continuously-variable transmission mechanism 24 can be appropriately controlled.

In the present embodiment, the plurality of transition-completion conditions include the [CONDITION 1] that is required to determine that the transition of the operation state of the second clutch C2 to the engaging process state from the fully released state or releasing process state has been completed. It is determined that the operation state of the second clutch C2 has been switched to the engaging process state, if the [CONDITION 1] is satisfied when the second clutch C2 had been in the fully released state or releasing process state. Thus, the engaging process state as the operation state of the second clutch C2 can be appropriately determined.

In the present embodiment, the plurality of transition-completion conditions include the [CONDITION 2] that is required to determine that the transition of the operation state of the second clutch C2 to the fully released state from the fully engaged state, releasing process state or engaging process state has been completed. The [CONDITION 2] includes the first, second and third requirement options. It is determined that the operation state of the second clutch C2 has been switched to the fully released state, if any one of the first, second and third requirement options of the [CONDITION 2] is satisfied when the second clutch C2 had been in the fully engaged state, releasing process state or engaging process state. Thus, the fully released state as the operation state of the second clutch C2 can be appropriately determined.

In the present embodiment, the plurality of transition-completion conditions include the [CONDITION 3] that is required to determine that the transition of the operation state of the second clutch C2 to the fully engaged state from the fully released state, releasing process state or engaging process state has been completed. The [CONDITION 3] includes the first and second requirement options. It is determined that the operation state of the second clutch C2 has been switched to the fully engaged state, if either one of the first and second requirement options of the [CONDITION 3] is satisfied when the second clutch C2 had been in the fully released state, releasing process state or engaging process state. Thus, the fully engaged state as the operation state of the second clutch C2 can be appropriately determined.

In the present embodiment, the plurality of transition-completion conditions include the [CONDITION 4] that is required to determine that the transition of the operation state of the second clutch C2 to the releasing process state from the fully engaged state has been completed. It is determined that the operation state of the second clutch C2 has been switched to the releasing process state, if the [CONDITION 4] is satisfied when the second clutch C2 had been in the fully engaged state. Thus, the releasing process state as the operation state of the second clutch C2 can be appropriately determined.

In the present embodiment, the plurality of transition-completion conditions include the [CONDITION 5] that is required to determine that the transition of the operation state of the second clutch C2 to the releasing process state from the engaging process state has been completed. It is determined that the operation state of the second clutch C2 has been switched to the releasing process state, if the [CONDITION 5] is satisfied when the second clutch C2 had been in the engaging process state. Thus, the releasing process state as the operation state of the second clutch C2 can be appropriately determined.

In the present embodiment, the operation state of the second clutch C2 can be determined with improved accuracy in the C2 engaging hydraulic control and the C2 releasing hydraulic control.

While the preferred embodiment of this invention has been described in detail by reference to the drawings, it is to be understood that the invention may be otherwise embodied.

The control routine shown in the flow chart of FIG. 11 may be modified as needed. For example, steps S20–S50 may be integrated into a single step so that the determinations made in steps S20-S50 are made in the single step.

In the above-described embodiment, the continuously-variable transmission mechanism 24 is a belt-type continuously-variable transmission. However, the continuously-variable transmission mechanism provided in the second drive-force transmitting path PT2 may be a known toroidal-type continuously variable transmission, for example.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and/or a gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the target drive force Fwtgt that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-three transmitting path PT1 through which the drive force is to be transmitted by the gear mechanism 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism (belt-type continuously-variable transmission)
28: gear mechanism
30: output shaft (output rotary member)
60: primary pulley
60c: hydraulic actuator
64: secondary pulley
64c: hydraulic actuator
66: transmission belt (transfer element)
90: electronic control apparatus (control apparatus)
94: transmission shifting control portion
96: operation-state determining portion
C1: first clutch (first engagement device)
C2: second clutch (second engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus includes:
an input rotary member to which a drive force is to be transmitted from the drive three source;
an output rotary ember from which the drive force is to be outputted to the drive wheels;
a gear mechanism configured to provide at least one gear ratio;
a continuously-variable transmission mechanism;
a first engagement device; and
a second engagement device whose operation state is to be switched among a plurality of states including a fully released state, a fully engaged state, a releasing process state and an engaging process state, by a hydraulic pressure which is supplied to the second engagement device and which is subjected to a hydraulic control,
wherein the drive-force transmitting apparatus defines a plurality of drive-force transmitting paths that are provided in parallel with each other between the input rotary member and the output rotary member,
wherein the plurality of drive-force transmitting paths include a first drive-force transmitting path through which the drive force is to be transmitted by the gear mechanism when the first drive-force transmitting path is established by engagement of the first engagement device,
wherein the plurality of drive-force transmitting paths include a second drive-force transmitting path through which the drive force is to be transmitted by the continuously-variable transmission mechanism when the second drive-force transmitting path is established by engagement of the second engagement device, and
wherein said control apparatus comprises:
an operation-state determining portion that is configured to determine which one of the plurality of states is established as the operation state of the second engagement device, by determining whether a plurality of transition-completion conditions, each of which is required to determine that a transition of the operation state of the second engagement device to a corresponding one of the plurality of states from another of the plurality of states has been completed, are satisfied or not, based on (α) a state of the hydraulic control executed to control the hydraulic pressure supplied to the second engagement device and (β) a rotational speed difference of the second engagement device.

2. The control apparatus according to claim 1,
wherein the continuously-variable transmission mechanism includes (i) a primary pulley, (ii) a secondary pulley, (iii) a transfer element that is looped over the primary and secondary pulleys, (iv) a primary hydraulic actuator configured to apply, to the primary pulley, a primary thrust based on which the transfer element is to be clamped by the primary pulley, and (v) a secondary hydraulic actuator configured to apply, to the second primary pulley, a secondary thrust based on which the transfer element is to be clamped by the secondary pulley, and wherein said control apparatus comprises a transmission shifting control portion configured to calculate an input torque which is inputted to the continuously-variable transmission mechanism and which is used in calculations of a target value of the primary thrust and a target value of the secondary thrust, such that the input torque is calculated depending on said one of the plurality of states that is determined, by said operation-state determining portion, to be established as the operation state of the second engagement device.

3. The control apparatus according to claim 2, wherein said transmission shifting control portion is configured to calculate, as the input torque which is inputted to the continuously-variable transmission mechanism, (a) a first input torque that is used in calculation of a thrust ratio which is a ratio of the secondary thrust to the primary thrust and which is for establishing a target gear ratio of the continuously-variable transmission mechanism and (b) a second input torque that is used in calculation of the primary and secondary thrusts required to prevent a slippage of the transfer element in the continuously-variable transmission mechanism.

4. The control apparatus according to claim 1,
wherein said plurality of transition-completion conditions include a first condition that is required to determine that the transition of the operation state of the second engagement device to the engaging process state from the fully released state or releasing process state has been completed,
wherein the first condition is that the hydraulic control is executed to engage the second engagement device, and
wherein said operation-state determining portion is configured to determine that the operation state of the second engagement device has been switched to the engaging process state, if the first condition is satisfied when the second engagement device had been in the fully released state or releasing process state.

5. The control apparatus according to claim 1,
wherein said plurality of transition-completion conditions include a second condition that is required to determine that the transition of the operation state of the second engagement device to the fully released state from the fully engaged state, releasing process state or engaging process state has been completed,
wherein the second condition includes first, second and third requirement options, such that (i) the first requirement option is that a rotational speed of an input shaft of the continuously-variable transmission mechanism is not lower than a predetermined speed value and a rotational speed difference of the second engagement device is larger than a first predetermined difference value with the hydraulic control being executed to release the second engagement device by a command requesting the supplied hydraulic pressure to be not higher than a first predetermined pressure value, (ii) the second requirement option is that the rotational speed of the input shaft of the continuously-variable transmission mechanism is lower than the predetermined speed value and the hydraulic control is executed to release the second engagement device by a command requesting the supplied hydraulic pressure to be not higher than a second predetermined pressure value that is lower than the first predetermined pressure value, and (iii) the third requirement option is that the drive-force transmitting apparatus is placed in a neutral state with both of the first and second engagement devices being released, and wherein said operation-state determining portion is configured to determine that the operation state of the second engagement device has been switched to the fully released state, if any one of the first, second and third requirement options of the second condition is satisfied when the second engagement device had been in the fully engaged state, releasing process state or engaging process state.

6. The control apparatus according to claim 1,
wherein said plurality of transition-completion conditions include a third condition that is required to determine that the transition of the operation state of the second engagement device to the fully engaged state from the fully released state, releasing process state or engaging process state has been completed,
wherein the third condition includes first and second requirement options, such that (i) the first requirement option is that a rotational speed difference of the second engagement device is smaller than a second predetermined difference value with the hydraulic control being executed to engage the second engagement device by a command requesting the supplied hydraulic pressure to be not lower than a third predetermined pressure value, and (ii) the second requirement option is that the state of the hydraulic control has been switched from execution for engaging the second engagement device to execution for maintaining the fully engaged state, and
wherein said operation-state determining portion is configured to determine that the operation state of the second engagement device has been switched to the fully engaged state, if either one of the first and second requirement options of the third condition is satisfied when the second engagement device had been in the fully released state, releasing process state or engaging process state.

7. The control apparatus according to claim 1,
wherein said plurality of transition-completion conditions include a fourth condition that is required to determine that the transition of the operation state of the second engagement device to the releasing process state from the fully engaged state has been completed,
wherein the fourth condition is that a rotational speed difference of the second engagement device is not smaller than a third predetermined difference value with the hydraulic control being executed to release the second engagement device, and
wherein said operation-state determining portion is configured to determine that the operation state of the second engagement device has been switched to the releasing process state, if the fourth condition is satisfied when the second engagement device had been in the fully engaged state.

8. The control apparatus according to claim 1,
wherein said plurality of transition-completion conditions include a fifth condition that is required to determine that the transition of the operation state of the second engagement device to the releasing process state from the engaging process state has been completed,
wherein the fifth condition is that the hydraulic control is executed to release the second engagement device, and
wherein said operation-state determining portion is configured to determine that the operation state of the second engagement device has been switched to the releasing process state, if the fifth condition is satisfied when the second engagement device had been in the engaging process state.

9. The control apparatus according to claim 1,
wherein the hydraulic control is executed to engage or release the second engagement device, by controlling the hydraulic pressure supplied to the second engagement device,
wherein the hydraulic control is executed to engage the second engagement device, when a first state of the drive-force transmitting apparatus in which the first drive-force transmitting path is established is to be switched to a second state of the drive-force transmitting apparatus in which the second drive-force transmitting path is established, or when a neutral state of the drive-force transmitting apparatus in which both of the first and second engagement devices are released is to be switched to the second state of the drive-force transmitting apparatus, and
wherein the hydraulic control is executed to release the second engagement device, when the second state of the drive-force transmitting apparatus is to be switched to the first state of the drive-force transmitting apparatus, or when the second state of the drive-force transmitting apparatus is to be switched to the neutral state of the drive-force transmitting apparatus.

10. The control apparatus according to claim 1,
wherein said plurality of transition-completion conditions include (i) a second condition that is required to determine that the transition of the operation state of the second engagement device to the fully released state from the fully engaged state, releasing process state or engaging process state has been completed, and (ii) a third condition that is required to determine that the transition of the operation state of the second engagement device to the fully engaged state from the fully released state, releasing process state or engaging process state has been completed,
wherein said operation-state determining portion is configured to determine whether the second condition is satisfied or not, based on ($\alpha$) the state of the hydraulic control executed to control the hydraulic pressure supplied to the second engagement device and ($\beta$) the rotational speed difference of the second engagement device, and
wherein said operation-state determining portion is configured to determine whether the third condition is satisfied or not, based on ($\alpha$) the state of the hydraulic control executed to control the hydraulic pressure supplied to the second engagement device and ($\beta$) the rotational speed difference of the second engagement device.

* * * * *